United States Patent [19]
Ito et al.

[11] Patent Number: 5,559,649
[45] Date of Patent: Sep. 24, 1996

[54] DISC CARTRIDGE LOADING APPARATUS IN RECORDING AND/OR REPRODUCING APPARATUS

[75] Inventors: Masayasu Ito; Hiroyuki Chigasaki, both of Tokyo, Japan

[73] Assignee: Sony Corporation, Tokyo, Japan

[21] Appl. No.: 283,724

[22] Filed: Jul. 27, 1994

Related U.S. Application Data

[63] Continuation of Ser. No. 966,103, Oct. 22, 1992, abandoned.

[30] Foreign Application Priority Data

Oct. 23, 1991 [JP] Japan .................................. 3-304042
May 25, 1992 [JP] Japan .................................. 4-157482

[51] Int. Cl.$^6$ .............................................. G11B 17/04
[52] U.S. Cl. ................................. 360/99.06; 360/99.02; 369/75.2
[58] Field of Search ............................. 360/98.06, 86, 360/97.02, 97.04, 99.02, 99.03, 99.06, 99.07, 99.12, 96.5; 369/75.1, 75.2, 263

[56] References Cited

U.S. PATENT DOCUMENTS

| | | | |
|---|---|---|---|
| 4,719,526 | 1/1988 | Okita et al. ........................... | 360/97 |
| 4,727,444 | 2/1988 | Fukushima et al. ................. | 369/75.2 |
| 4,794,481 | 12/1988 | Suyama et al. ..................... | 360/99.06 |
| 5,012,462 | 4/1991 | Isujita ................................... | 369/77.1 |
| 5,062,099 | 10/1991 | Odawara et al. ..................... | 369/263 |
| 5,084,855 | 1/1992 | Kobayashi et al. ................. | 369/75.2 |
| 5,163,038 | 11/1992 | Arai ...................................... | 369/75.2 |
| 5,198,933 | 3/1993 | Matsushita et al. ................. | 360/99.06 |
| 5,278,819 | 1/1994 | Shimegi et al. ..................... | 360/99.06 |

FOREIGN PATENT DOCUMENTS

| | | |
|---|---|---|
| 82505 | 12/1982 | European Pat. Off. . |
| 0157588 | 10/1985 | European Pat. Off. ............ 360/99.03 |
| 449468 | 3/1991 | European Pat. Off. . |
| 3719571 | 6/1987 | Germany . |
| 3818503 | 5/1988 | Germany . |
| 3911714 | 4/1989 | Germany . |

*Primary Examiner*—Stuart S. Levy
*Assistant Examiner*—Kevin M. Watkins
*Attorney, Agent, or Firm*—Jay H. Maioli

[57] ABSTRACT

A disc cartridge loading apparatus for a recording/reproducing apparatus for loading a disc cartridge housing an information signal recording medium on a cartridge loading unit in the recording/reproducing apparatus, including a drive unit supporting base plate having a driving unit for a disc loaded on it and supported flexibly on a stationary substrate by an elastic supporting member; a cartridge holder for supporting the disc cartridge inserted into a main body of the recording/reproducing apparatus and movably supported by the drive unit supporting base plate by plural supporting members projected on both sides thereof and a cartridge holder transporting member movably supported by the stationary substrate for movement in a direction of insertion or ejection into or from a main body of the recording/reproducing apparatus; the cartridge holder transporting member having a cam groove and being moved for loading the disc cartridge; the cam groove having an opening at one of its ends and an engagement between the supporting member and the cam groove being released in a state of completion of loading of the disc cartridge. The disc driving unit for recording and/or reproducing information signals on or from the disc being supported in a floating condition.

11 Claims, 19 Drawing Sheets

DISC CARTRIDGE LOADING APPARATUS IN RECORDING AND/OR REPRODUCING APPARATUS

This is a continuation of application Ser. No. 07/966,103 filed Oct. 22, 1992 now abandoned.

BACKGROUND OF THE INVENTION

1. Field of the Invention

This invention relates to a disc cartridge loading apparatus in a recording and/or reproducing apparatus by means of which a disc cartridge housing a disc employed as a recording medium for information signals therein is loaded on a cartridge loading unit within the recording and/or reproducing apparatus. More particularly, it relates to such disc cartridge loading apparatus which may be applied to a recording and/or reproducing apparatus in which drive a supporting base plate, having loaded thereon a disc rotating and driving unit and recording and/or reproducing means recording and/or reproducing information signals on or from the disc, is flexibly supported via elastic supporting means on a stationary substrate constituting or fixedly mounted on the main body of the recording and/or reproducing apparatus.

2. Description of the Related Art

The conventional recording and/or reproducing apparatus employing a disc cartridge having a disc housed therein as a recording/reproducing medium is usually provided with a loading mechanism whereby the disc cartridge inserted into the main body of the apparatus is automatically captured and caused to be supported in position on the cartridge loading unit in the main body of the apparatus and the disc housed in the disc cartridge is loaded on the disc rotating and driving unit, and whereby the disc is released from the disc rotating and driving unit and automatically ejected out of the main body of the apparatus.

This type of the recording/reproducing apparatus is made up of a drive supporting base plate and an outer housing member having enclosed therein the drive supporting base plate. On the drive supporting base plate, there are mounted the disc rotating and driving unit, an optical pickup as recording/reproducing means and a pickup driving unit for moving the optical pickup radially with respect to the disc.

In a desk top type recording/reproducing apparatus, the drive supporting base plate is secured to the stationary substrate constituting or fixedly mounted on the main body of the recording and/or reproducing apparatus.

Meanwhile, a portable type or car-laden recording/reproducing apparatus is subject to vibrations applied from outside. If the apparatus is used in an environment subject to extraneous vibrations, the disc cannot be stably rotated, and a stable feed operation of the optical pickup cannot be made. The result is that the recording track on the disc cannot be tracked correctly by a light beam radiated from the optical pickup for recording/reproducing information signals thereby rendering it impossible to effect recording/reproduction of information signals.

For this reason, in a portable type or car-laden recording/reproducing apparatus, the drive supporting base plate is mounted on the stationary substrate via a vibration-absorbing unit capable of absorbing the extraneous vibrations. The vibration absorbing unit is formed of rubber so that the drive supporting base plate is supported in a floating state and capable of being easily displaced with respect to the stationary substrate.

On the other hand, the loading mechanism for automatically capturing the disc cartridge introduced into the main body of the apparatus and loading it on the cartridge loading unit in the main body for loading the disc housed in the disc cartridge on the disc rotating and driving unit is arranged on the outer housing member. This is because the disc cartridge introduced via cartridge insertion/ejection opening provided on the outer housing member is to be reliably held and captured into the inside of the apparatus and the disc cartridge ejected from the apparatus is also to be transferred positively to the cartridge insertion/ejection opening.

In the above-described recording and/or reproducing apparatus in which the drive supporting base plate is supported in a floating state on a stationary substrate constituting or fixedly mounted on the main body of the recording and/or reproducing apparatus, and the loading mechanism is arranged on the stationary substrate, the drive supporting base plate, on which the disc cartridge is loaded, is not fixed in position, but tends to be displaced easily. The result is that it becomes impossible to load the disc cartridge in position on the cartridge loading unit for loading the disc reliably on the disc rotating and driving unit.

Consequently, it has been proposed to provide in this type of the recording and/or reproducing apparatus a locking unit for securing the drive supporting base plate to the stationary housing member during the loading and unloading of the disc cartridge into or out of the main body of the apparatus.

A typical example of this type of the apparatus is shown in JP Patent KOKAI Publications Nos. 60-115087 (1985) and 60-147964 (1985).

However, the conventional locking unit for securing the drive supporting base plate to the stationary substrate is independent of the loading unit and makes use of a solenoid plunger or a driving motor as a driving source, so that it complicates the mechanism, and makes the recording/reproducing apparatus bulky in size, thus proving to be a hindrance to reduction in size and weight of the apparatus.

OBJECT AND SUMMARY OF THE INVENTION

It is an object of the present invention to provide a disc cartridge loading apparatus in a recording and/or reproducing apparatus in which the drive supporting base plate supported in a floating state on a stationary substrate constituting an outer housing member of or fixedly mounted on the main body of the recording and/or reproducing apparatus may be positively locked on the fixed outer housing member.

It is another object of the present invention to provide a disc cartridge loading apparatus in a recording and/or reproducing apparatus in which the mechanism for locking the drive supporting base plate supported in a floating state on a stationary substrate constituting an outer housing member to the stationary outer housing member may be simplified for reducing the size and the weight of the recording/reproducing apparatus.

It is a further object of the present invention to provide a disc cartridge loading apparatus in a recording and/or reproducing apparatus in which, if a disc cartridge is already introduced into the main body of the recording and/or reproducing apparatus, the insertion of another disc cartridge may be inhibited to protect the disc cartridge as well as to prevent the driving unit supported in a floating state from being injured.

It is a further object of the present invention to provide a disc cartridge loading apparatus in which the disc cartridge loading operation is initiated only after insertion of the disc cartridge into the cartridge holder to realize the disc cartridge loading operation reliably.

It is a further object of the present invention to provide a disc cartridge loading apparatus in which loading of a disc cartridge mistakenly inserted into the cartridge holder may be reliably inhibited to realize protection of the disc cartridge and the loading apparatus.

It is a further object of the present invention to provide a disc cartridge loading apparatus in which the disc cartridge may be positively ejected in connection with movement of the cartridge holder holding the disc cartridge to realize stable and positive disc cartridge election.

It is a further object of the present invention to provide a disc cartridge loading apparatus having a simplified construction and which may be reduced in size.

In accordance with the present invention, there is provided a disc cartridge loading apparatus for a recording/reproducing apparatus for loading a disc cartridge housing an information signal recording medium therein on a cartridge loading unit in the recording/reproducing apparatus, comprising a drive unit supporting base plate having loaded thereon a driving unit for a disc, said driving unit, supporting base plate being supported in a displaceable state on a stationary substrate by elastic supporting means, a cartridge holder for supporting said disc cartridge inserted into the recording/reproducing apparatus, said cartridge holder being movably supported by said drive unit supporting base plate by plural supporting members projected on both sides thereof, and a cartridge holder transporting member movably supported by said stationary substrate for movement in a direction of insertion or ejection into or from a main body of the recording/reproducing apparatus, said cartridge holder transporting member having a cam groove and being able to be moved for loading said disc cartridge, said cam groove having an opening at one end thereof and an engagement between said supporting member and said cam groove; being released when a state of completion of loading of said disc cartridge has been attained.

The disc cartridge loading apparatus in the recording/reproducing apparatus according to the present invention is provided with cartridge insertion inhibiting means which is operated in connection with movement of the cartridge holder transporting member for inhibiting insertion of the disc cartridge into the cartridge insertion/ejection opening provided in the recording/reproducing apparatus at least during disc cartridge loading.

The disc cartridge loading apparatus of the present invention also comprises a disc driving unit having loaded thereon the disc rotating and driving unit, a cartridge holder moved relative to the disc driving unit, and means for unifying the disc driving unit and the cartridge holder to each other when the cartridge holder is moved to a position of loading the disc on the disc driving unit.

The disc cartridge loading apparatus of the present invention also comprises an ejection initiating unit in the cartridge holder transporting member for initiating an ejecting operation of the ejection unit ejecting the disc cartridge held by the cartridge holder in the course of the resetting movement of the cartridge holder transporting member towards a position of effecting insertion/ejection of the disc cartridge with respect to the cartridge holder.

The disc cartridge loading apparatus of the present invention also comprises means for controlling the position of the transporting member to a position in which the cartridge holder is moved to a position enabling the disc cartridge to be inserted into and ejected from the cartridge holder, and means for detecting the cartridge position for controlling the position controlling means in response to the detected state.

In the disc cartridge loading apparatus for the recording/reproducing apparatus according to the present invention, the disc cartridge inserted into and held by the cartridge holder is loaded by movement of the cartridge holder transporting member. In the disc cartridge loading state, a supporting member provided on the cartridge holder is kept engaged in the cam groove formed in the cartridge holder transporting member and the drive supporting base plate is held with position control on the stationary substrate.

On completion of disc cartridge loading, the supporting member provided on the cartridge holder is disengaged from the cam groove formed in the cartridge holder transporting member, while the cartridge holder and the supporting base plate are no longer held by the stationary substrate, but are supported solely by the elastic supporting means on the substrate.

The supporting member provided on the cartridge holder and disengaged from the cam groove during ejection of the disc cartridge from the main body is position-controlled to be engaged at an opening end of the cam groove by cartridge position adjustment means.

When the transporting member is moved in a direction of ejecting the disc cartridge, the supporting member provided on the cartridge holder is position-control led by the cartridge position adjustment means so as to be engaged in the cam groove formed in the transporting member.

When the disc transporting member starts to load the disc cartridge in the cartridge loading direction, cartridge insertion inhibiting means is moved towards the cartridge insertion/ejection opening for inhibiting disc cartridge insertion.

Other objects and advantages of he present invention will become clear from the following description.

DETAILED DESCRIPTION OF THE PREFERRED EMBODIMENTS

Figure 1:
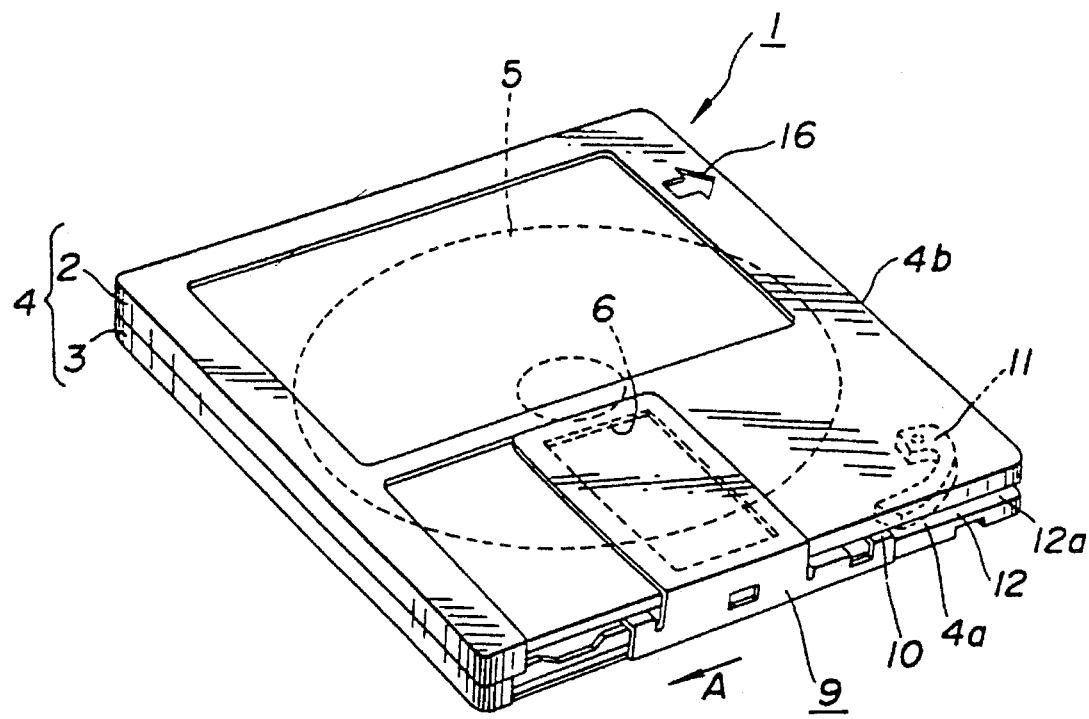
FIG. 1 is a perspective view showing an upper side of a disc cartridge applied to a disc cartridge loading apparatus for a recording/reproducing apparatus according to the present invention.
Figure 2:
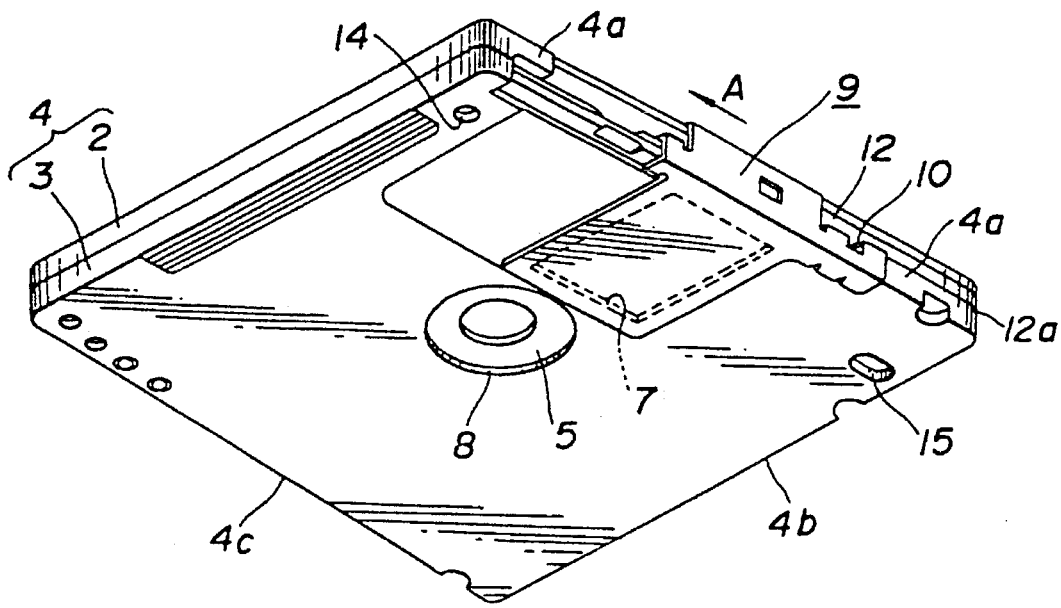
FIG. 2 is a perspective view showing the lower side of the disc cartridge shown in FIG. 1.
Figure 3:
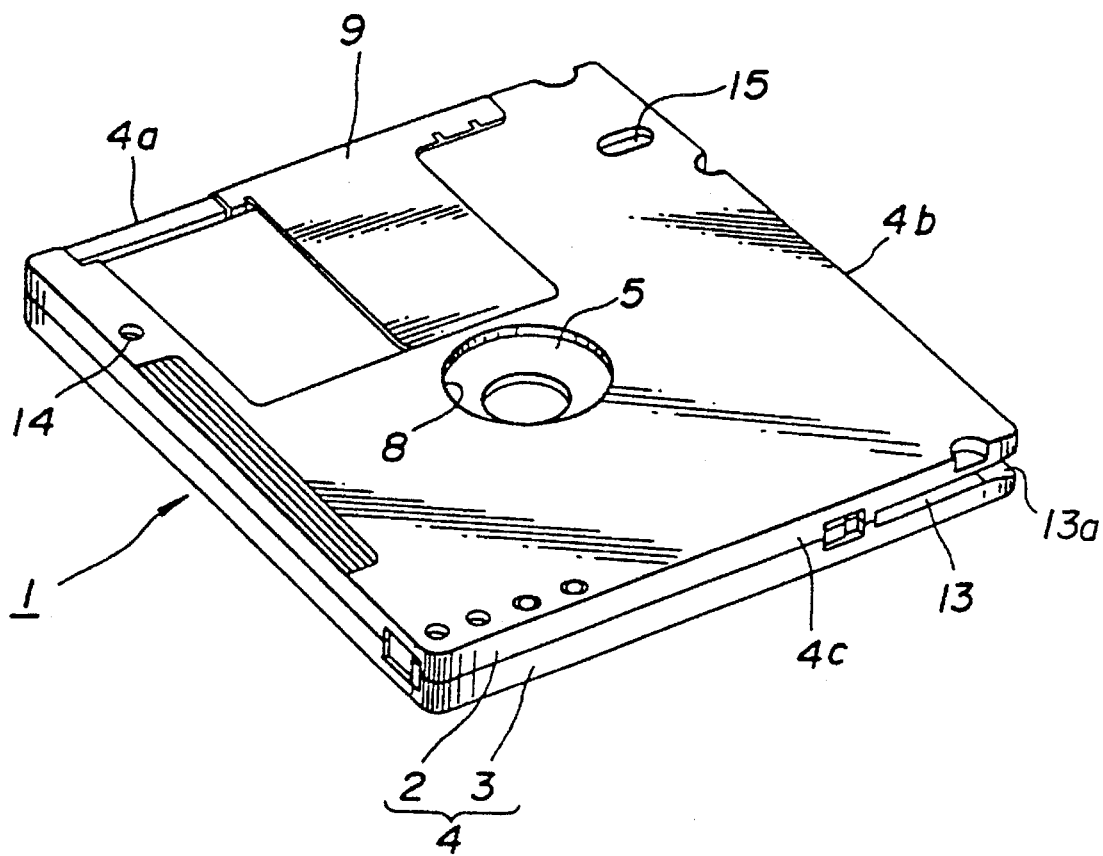
FIG. 3 is a perspective view showing the rear side of the disc cartridge shown in FIG. 1, as viewed from the upper side.

The disc cartridge loading apparatus according to the present invention is hereinafter explained with reference to an example in which the disc cartridge loading apparatus is applied to a disc player making use of a disc cartridge 1 arranged as shown in FIGS. 1 to 3 as a recording medium.

The disc cartridge 1 employed in the disc player to which the present invention is applied is first explained. The disc cartridge 1 comprises a cartridge main body 4 made up of an upper half 2 and a lower half 3 abutted on and connected to each other, and an optical disc 5 rotatably housed therein, as shown in FIGS. 1 to 3. The optical disc 5 is a disc on which information signals, such as music sound signals, have been to be recorded, or are recorded previously.

On the upper and the lower surfaces of the cartridge main body 4, housing the optical disc 5 therein, signal recording/reproducing apertures 6, 7 are formed for exposing a part of a signal recording region of the optical disc 5. In a mid part of the lower surface of the cartridge main body 4, there is formed a disc table entrance opening 8, by means of which a disc table of a disc rotating and driving unit for rotationally driving the optical disc 5 is introduced, as shown in FIG. 2.

A shutter member 9 having a U-shaped cross-section is movably fitted on the cartridge main body 4 for keeping the signal recording/reproducing apertures 6, 7 closed when the disc cartridge 1 is in the non-use state of not being loaded in the disc player. The shutter member 9 is so arranged that, when it is in the position where the signal recording/reproducing apertures 6, 7 are closed, a locking lug 10 formed by segmenting and bending a part of the shutter member 9 is engaged with a shutter locking member 11 provided within the cartridge main body 4 for keeping the apertures 6, 7 closed.

When the disc cartridge 1 is introduced into the disc player as described subsequently, the shutter member 9 is thrust by a shutter member opening piece of a cartridge holder provided in the disc player and is moved in a direction of opening the signal recording/reproducing apertures 6, 7.

That is, a front side 4a of the cartridge main body 4 fitted with the shutter member 9 has a groove 12 into which the shutter member opening piece is introduced. When the shutter member opening piece is introduced into the groove 12, the shutter locking member 11 provided within the cartridge main body 4 is thrust and displaced by the shutter member opening piece for disengaging the locking lug 10 from the shutter locking member 11. With the locking lug 10 thus disengaged from the shutter locking member 11, the shutter member 9 may be moved freely. As the disc cartridge 1 is introduced into the cartridge holder, the shutter member 9 is moved by the shutter member opening piece in the direction shown by arrow A in FIGS. 1 and 2 for opening the signal recording/reproducing apertures 6, 7.

Thus the disc cartridge 1 is adapted for being inserted into the cartridge holder of the disc player with the direction of movement of the shutter member 9 relative to the cartridge main body 4 as the inserting direction. That is, the disc cartridge 1 is inserted into the cartridge holder with a lateral side 4b contiguous and normal to the front side 4a having an opening end 12a of the groove 12 as an inserting end.

Meanwhile, an inserting direction indicating mark 16, indicating that the lateral side 4b is the inserting end indicating the regular inserting direction, is provided on the upper side close to the lateral side 4b of the cartridge main body 4, as shown in FIG. 1.

In a rear side 4c of the cartridge main body 4, opposite to the front side 4a having the groove 12 into which the shutter member opening piece is introduced, a mistaken insertion inhibiting grove 13 is formed for controlling the inserting direction. The mistaken insertion inhibiting groove 13 is formed from a mid part of the rear side 4c so as to be terminated at an opening end 13a on the lateral side 4b of the cartridge main body 4.

The disc player, which has the above-described disc cartridge 1 as a recording medium and to which the disc cartridge loading apparatus according to the present invention is applied, is hereinafter explained.

Figure 4:
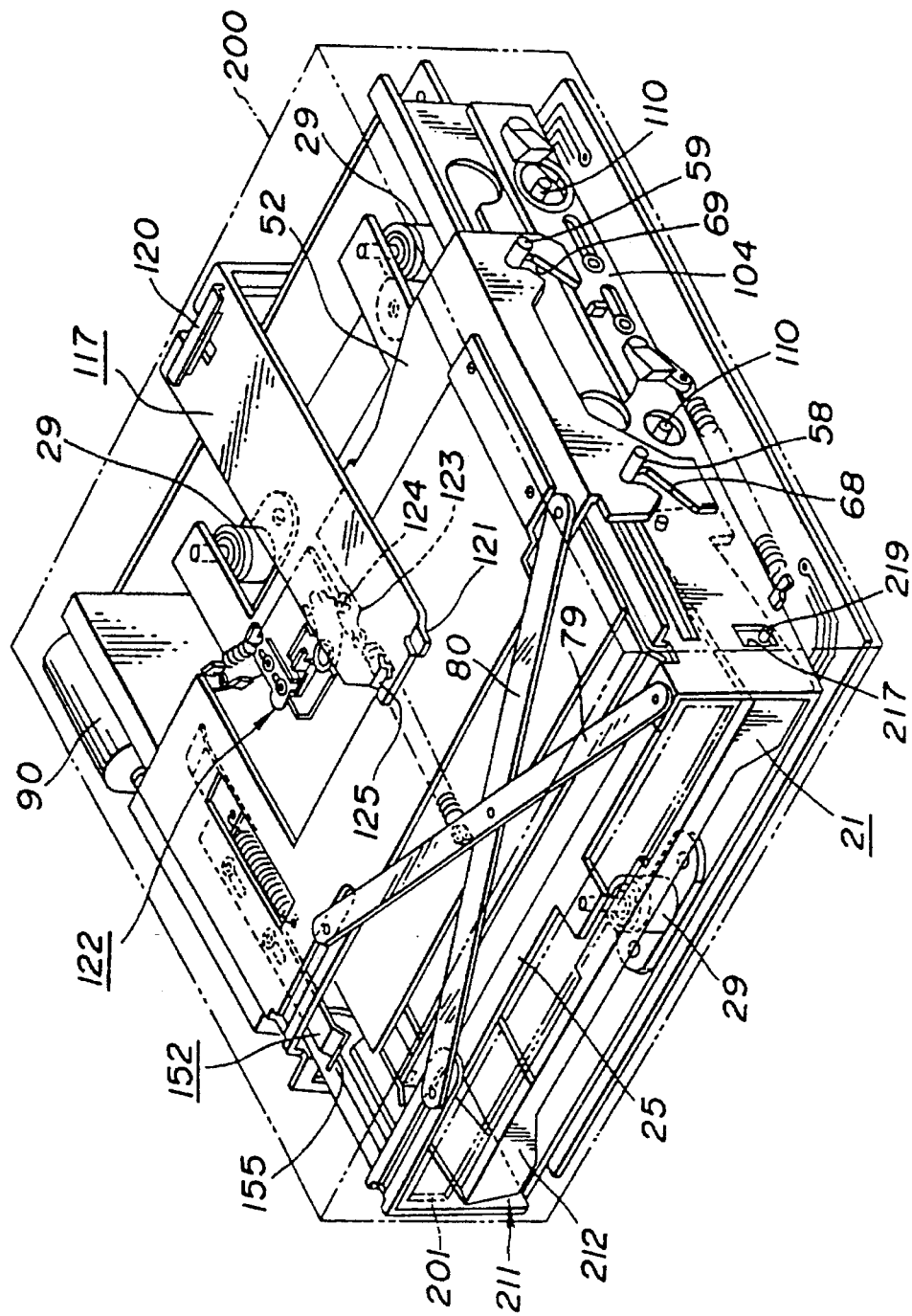
FIG. 4 is a perspective view showing the disc cartridge loading apparatus for a recording/reproducing apparatus according to the present invention.
Figure 5:
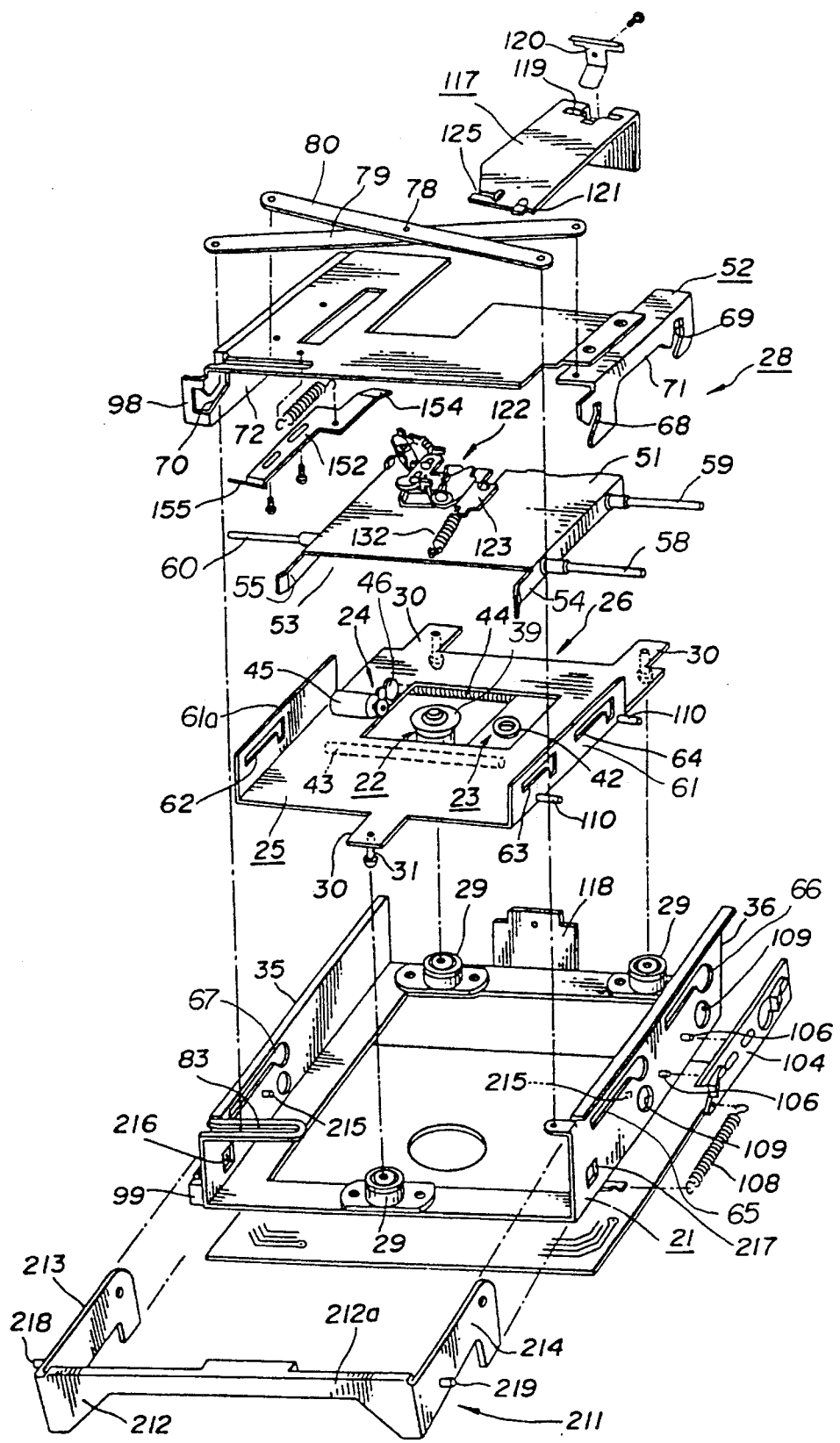
FIG. 5 is an exploded perspective view showing the disc cartridge loading apparatus for a recording/reproducing apparatus according to the present invention.

The disc player comprises, as shown in FIGS. 4 and 5, a stationary substrate 21 fixedly mounted on an outer casing of a player main body 200, a disc driving unit 26 including a driving unit supporting base plate 25, and a cartridge loading unit 28. In the disc driving unit 26, a disc rotating and driving unit 22 for rotationally driving the optical disc 5 housed within the disc cartridge 1 loaded on the disc player, an optical pickup 23 as recording and/or reproducing means for recording/reproducing information signals, such as music sound signals, on or from the optical disc 5 rotationally driven by the disc rotating and driving unit 22, and a pickup driving unit 24 for radially moving the optical pickup 23 with respect to the optical disc 5, are loaded on the supporting base plate 25. The cartridge loading unit 28 is adapted for transferring the disc cartridge 1 inserted into the player main body 200 via a cartridge inserting opening 201 formed in the player main body 200 towards the disc driving unit 26 for loading the optical disc 5 housed within the disc cartridge 1 on the disc rotating and driving unit 22.

Figure 7:
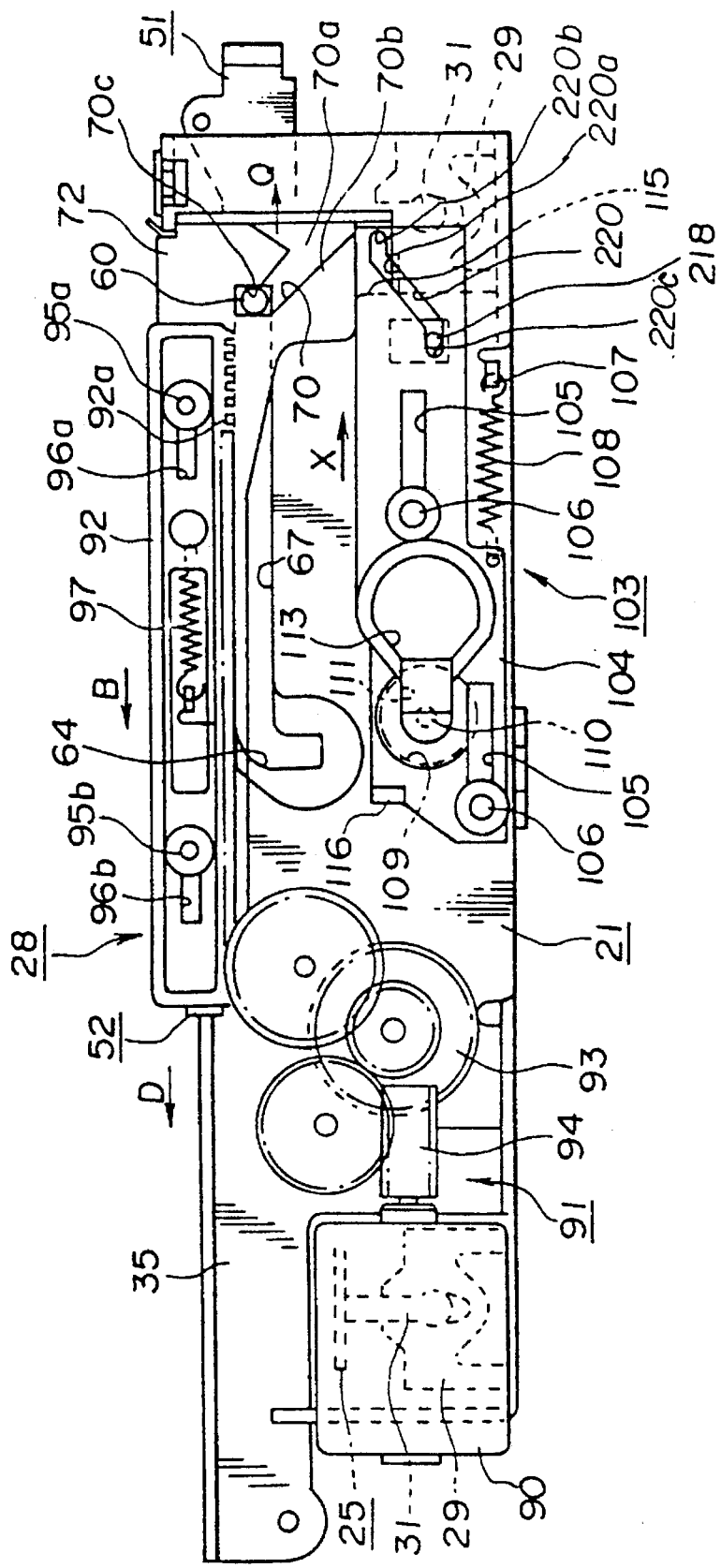
FIG. 7 is a right side view showing the disc cartridge loading apparatus according to the present invention, showing the state in which the cartridge holder has been moved to an initial position enabling the insertion or ejection of the disc cartridge.

The supporting base plate 25 of the disc driving unit 26 is formed by bending a thin metal sheet and is supported for displacement on the stationary substrate 21 by means of elastic supporting members 29 which are formed of an elastic material such as rubber and exhibit a vibration-absorbing function. The elastic supporting members 29 are mounted on the stationary substrate 21 formed by bending a thin metal plate. The supporting base plate 25 is supported on the stationary substrate 21 by engaging three supporting posts 31 depending from three supporting lugs 30 of the supporting base plate 25 as shown in FIG. 5 in three bottomed engaging holes 32 formed at mid parts of the elastic supporting members 29, as shown in FIG. 7. Two of the three supporting lugs 30 are formed on the front side of the supporting base plate 25, while the remaining lug 30 is formed on the rear side of the supporting base plate 25.

First and second lateral sidewalls 35, 36 are formed on the opposite sides of the stationary substrate 21.

The supporting base plate 25, supported in this manner by plural elastic supporting members 29, is supported on the stationary substrate 21 in a floating state, that is, in a state of being easily displaced or flexed vertically and horizontally. Since vibrations and impacts applied to the player main body 200 may be damped and absorbed by the elastic supporting members 29, the supporting base plate 25 may be prevented from being affected by these vibrations or impacts.

The disc driving unit 26, on which the disc cartridge 1 inserted into the player main body 200 is loaded in position, is comprised of the supporting base plate 25 supported in the above-mentioned floating state on the stationary substrate 21, as shown in FIGS. 4 and 5 having an opening formed therethrough. In the vicinity of the opening are set positioning pins (not shown) which are engaged in positioning holes 14, 15 formed in the lower side of the disc cartridge 1 for setting the loading position of the disc cartridge 1.

Figure 9:
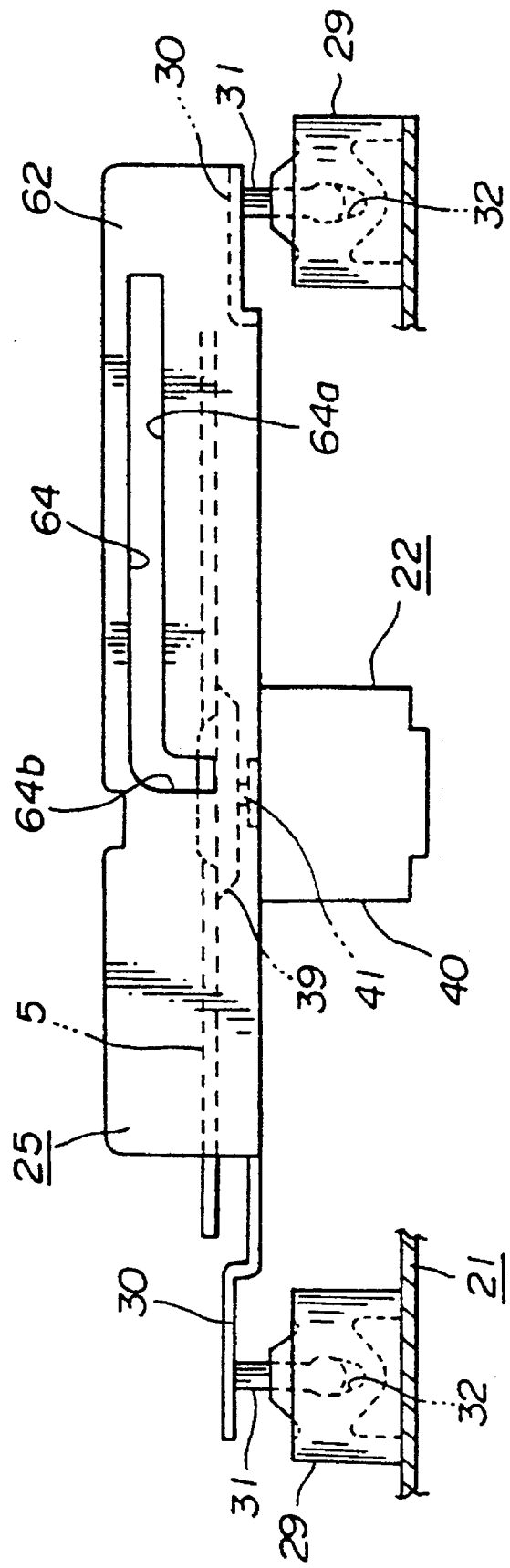
FIG. 9 is a cross-sectional view showing the state in which the drive supporting base plate is flexibly supported by the stationary substrate.

The disc rotating and driving unit 22 is mounted at a mid part of the supporting base plate 25, as shown in FIG. 5. The disc rotating and driving unit 22 is made up of a disc table 39 on which the optical disc 5 accommodated in the disc cartridge 1 is loaded and a spindle motor 40 adapted for rotationally driving the disc table 39, as shown in FIG. 9. The spindle motor 40 is mounted on the lower side of the supporting base plate 25 so that its spindle shaft 41 is projected at a mid part of the opening in the supporting base plate 25. The disc table 39 is mounted as one with the foremost part of the spindle shaft 41. A magnet for magnetically attracting and supporting a magnetic plate mounted at a mid part of the optical disc 5 is mounted on the disc table 39.

The optical pickup 23 is provided on the supporting base plate 25 for movement along the radius of the optical disc 5 loaded on the disc table 39, as shown in FIG. 5. The optical pickup 23 is supported on the lower surface of the supporting base plate 25 by a feed screw 44 and a guide shaft 43 mounted parallel to the feedscrew for movement along the radius of the optical disc 5, in a lateral direction, with an object lens 42 of the optical pickup 23 facing the major surface of the optical disc 5 loaded on the disc table 39. The optical pickup 23 is fed across the inner and outer peripheries of the optical disc 5 by the feed screw 44 which is rotated by a feed motor 45 of the pickup driving unit 24.

Meanwhile, the pickup feed motor 45 and the feed screw 44 are connected to each other by a speed-reducing gearing unit 46.

By loading the operating units, including the disc rotating and driving unit 22 and the optical pickup 23, on the supporting base plate 25 supported in the floating state, the disc driving unit 26 may be mounted in the floating state within the player main body 200.

The cartridge loading unit 28 for transferring the disc cartridge 1 introduced into the player main body 200 towards the disc driving unit 26 for loading the optical disc 5 in the disc cartridge 1 on the disc table 39 of the disc rotating and driving unit 22 is made up of a cartridge holder 51 for holding the disc cartridge 1 introduced into the player main body 200 and a cartridge holder transporting member 52 for transporting the cartridge holder 51 between the cartridge insertion and ejecting position and the disc cartridge loading position of loading the disc 1 on the cartridge disc driving unit 26, as shown in FIG. 4 and 5.

The cartridge holder 51 of the cartridge loading unit 28 is formed in the shape of a flat rectangle large enough in size to accommodate the disc cartridge 1 introduced into the player main body 200 via cartridge insertion/ejection opening 201, provided in the player main body 200. On both lateral sides of the cartridge holder 51, which are contiguous and normal to a forward opening 53 adapted for receiving the disc cartridge 1 introduced via the cartridge insertion/ejection opening 201, there are formed a pair of cartridge holding sections 54, 55 which are of U-shaped cross-section and which are adapted for holding the front side 4a fitted to the shutter member 9 and the rear side 4c having the mistaken insertion inhibiting groove 13, as shown in FIG. 5.

Figure 21:
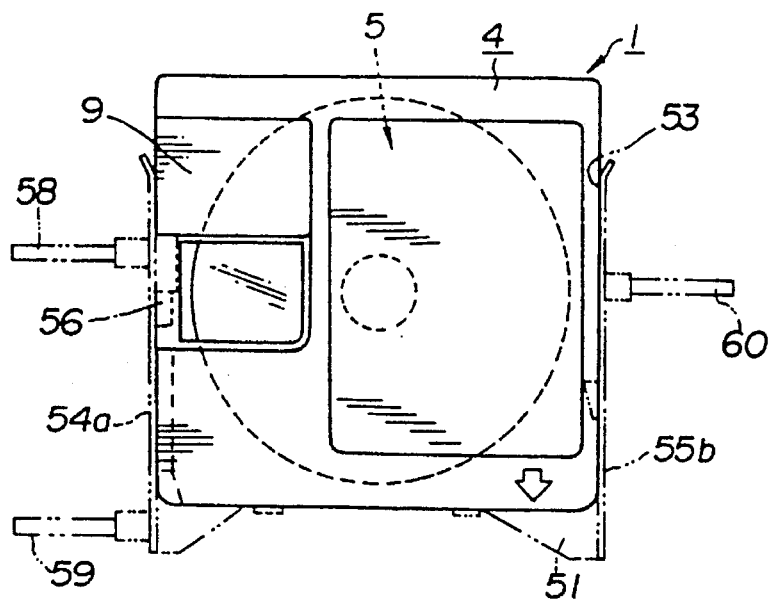
FIG. 21 is a plan view showing the state in which a disc cartridge has been inserted in a regular state into the cartridge holder.
Figure 23:
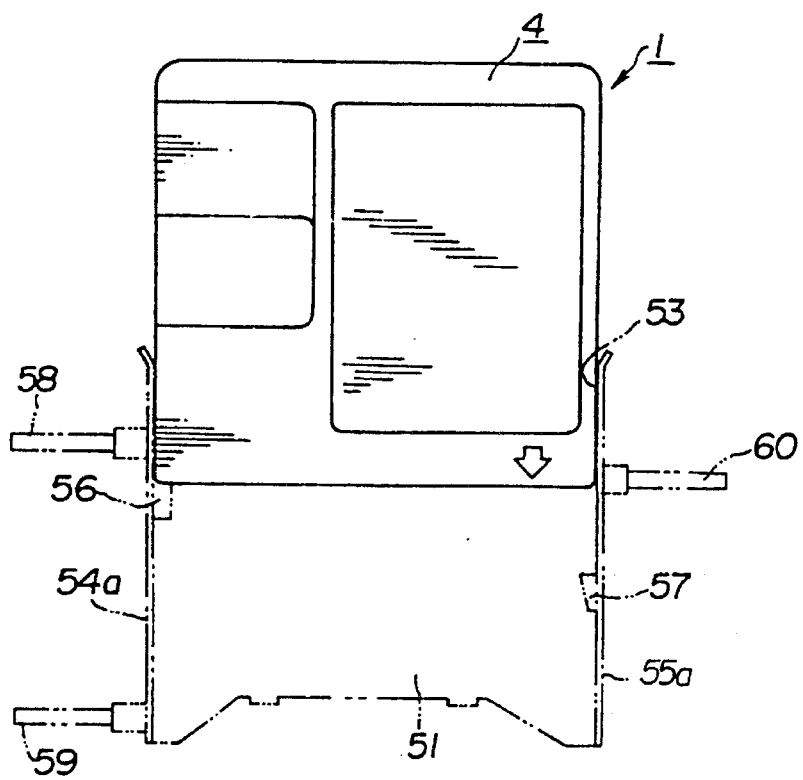
FIG. 23 is a plan view showing the state in which the disc cartridge inserted into and held by the cartridge holder has been ejected.
Figure 22:
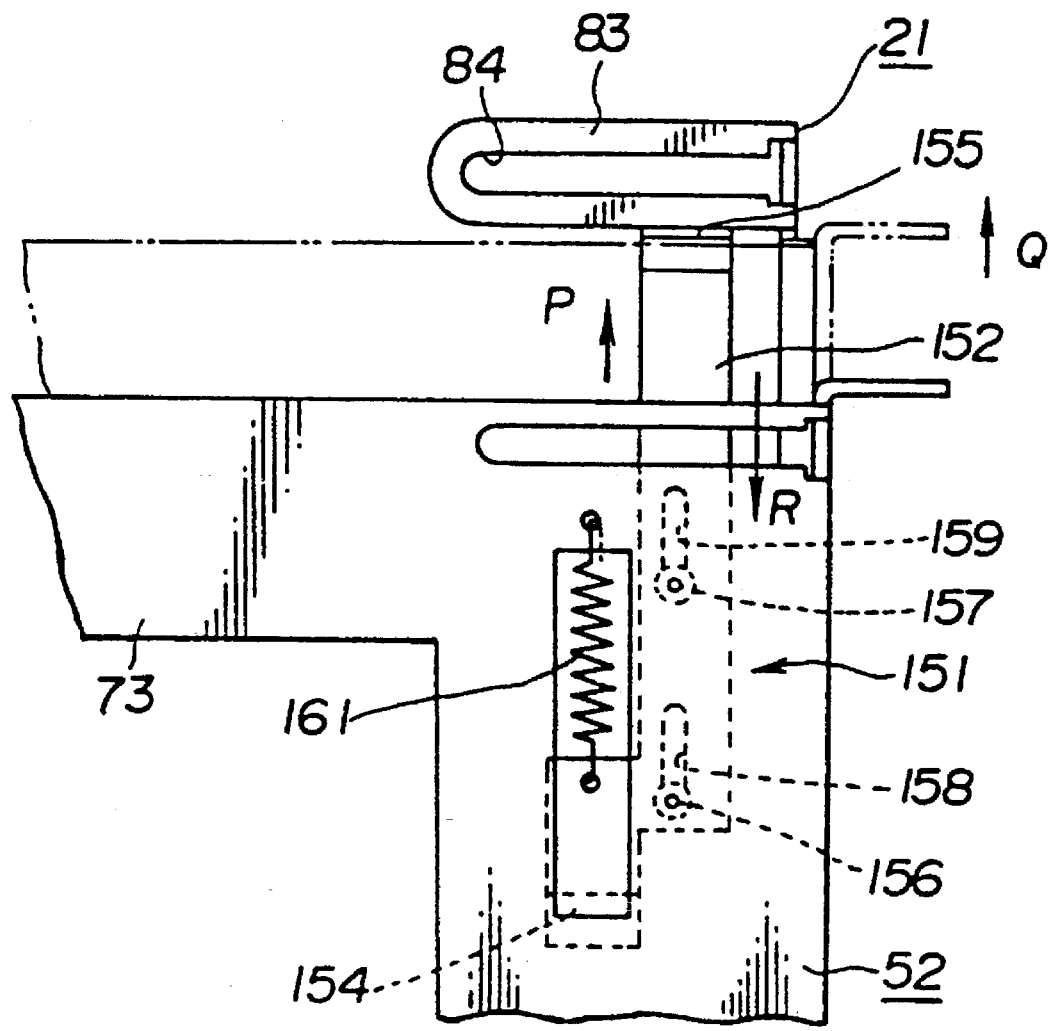
FIG. 22 is a plan view showing an ejection initiating mechanism for actuating the cartridge holder ejecting operation.

At a mid part on the inner lateral surface of the upstanding wall 54a of the cartridge holding section 54 of the cartridge holder 51, a shutter member opening piece 56 is mounted for being introduced into the groove 12 in the front side 4a of the disc cartridge 1 inserted into the cartridge holder 51 for thrusting and displacing the shutter locking member 11 for disengaging the locking lug 10 of the shutter member 9 from the shutter locking member 11 for moving the shutter member 9 in a direction of opening the signal recording/reproducing apertures 6, 7. At a mid part of the inner lateral surface of the cartridge holding section 55, there is formed a mistaken insertion inhibiting member 57 which is introduced into the mistaken insertion inhibiting groove 13 formed on the rear side 4c of the disc cartridge 1 inserted into the cartridge holder 51, as shown in FIGS. 21 and 22. By providing the cartridge holding sections 54, 55 with the shutter member opening piece 56 and the mistaken insertion inhibiting member 57, the disc cartridge 1 may be inserted into the cartridge holder 51 only when it is introduced with the correct inserting side oriented toward the inserting direction.

Meanwhile, the cartridge holding section 54 provided with the shutter member opening piece 56 is provided with a shutter member thrusting supporting spring 20 for holding the shutter member 9 attached to the disc cartridge 1 inserted into the cartridge holder 51 at a position of opening the signal recording/reproducing apertures 6, 7 and for holding the shutter member 9 for relative movement with respect to the cartridge main body 4 in the direction of closing the apertures 6, 7 when ejecting the disc cartridge 1 from the cartridge holder 51.

The shutter member thrusting supporting spring 20 also has the function of thrusting the disc cartridge 1 inserted into the cartridge holder 51 towards the cartridge holding section 55 provided with the mistaken insertion inhibiting member 57 for controlling the inserting position of the disc cartridge 1 into the cartridge holder 61.

Figure 6:
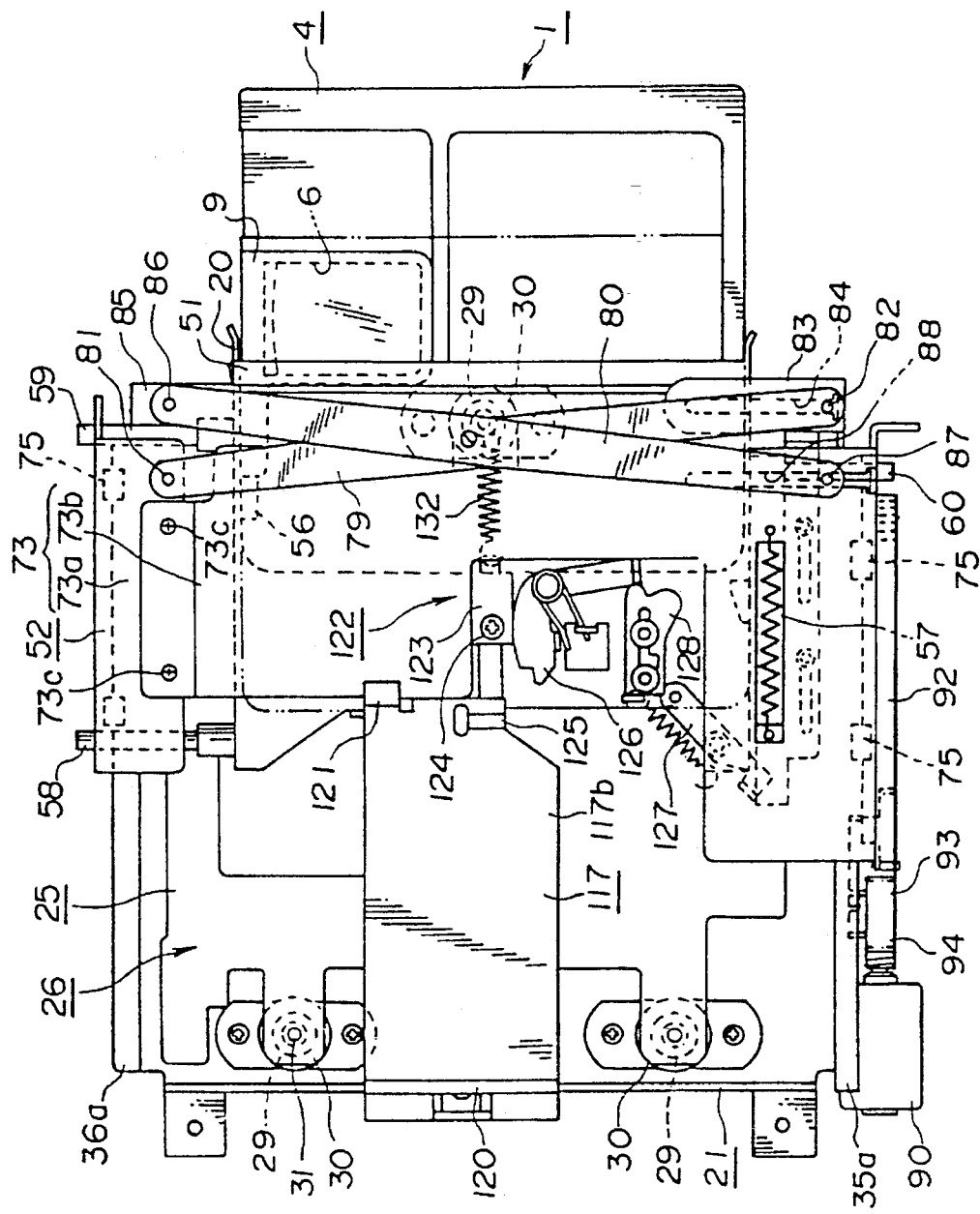
FIG. 6 is a plan view showing the disc cartridge loading apparatus according to the present invention, showing the state in which the cartridge holder has been moved to an initial position enabling the insertion or ejection of the disc cartridge.

On the outer lateral surfaces of upstanding sidewalls 54a, 55a making up the cartridge holding sections 54, 55 of the cartridge holder 51, there are provided plural supporting guide shafts 58, 59, 60 which project from cartridge holding sections 54, 55 and are used as supporting members for movably supporting the cartridge holder 51 with respect to the supporting base plate 25. In the embodiment illustrated, two of these guide shafts 58 to 60 are provided on the cartridge holder 54 and the remaining guide shaft is provided on the cartridge holder 55, as shown in FIGS. 5 and 6.

On the cartridge holder supporting sides of the supporting base plate 25, there are provided a pair of side plates 61, 61a facing the cartridge holding sections 54, 55 of the cartridge holder 61 provided on the driving unit supporting base plate 25, as shown in FIG. 5. Guide grooves 62, 63, 64 are formed in the side plates 61, 61a for accommodating the supporting guide shafts 58 to 60. The cartridge holder 51 is movably supported by the supporting base plate 25 by having the supporting guide shafts 58 to 60 introduced into the guide grooves 62 to 64, respectively.

Meanwhile, the guide grooves 62 to 64 are made up of horizontal guide groove portions 62a, 63a, 64a for guiding the horizontal movement between a position proximate to the cartridge insertion/ejection opening 201 of the player main body 200 enabling the disc cartridge 1 of the cartridge holder 51 to be loaded and a position enabling the disc cartridge 1 to be loaded on the cartridge disc driving unit 26, and vertical guide groove portions 62b, 63b, 64b for guiding the vertical movement between the position enabling the disc cartridge 1 to be loaded on the disc driving unit 26 and the position of enabling the optical disc 5 housed in the disc cartridge 1 to be loaded on the disc table 39, as shown in FIG. 4. The cartridge holder 51 having the supporting guide shafts 58, 59, 60 inserted into the cartridge holder guide grooves 62, 63, 64, each arranged in the shape of a letter L, with the horizontal guide groove portions 62a, 63a, 64a communicating with the vertical guide groove portions 62b, 63b, 64b, is supported on the driving unit supporting base plate 25 for movement horizontally between the position proximate to the cartridge insertion/ejection opening 201 and the position enabling the disc cartridge 1 to be loaded on the disc driving unit 26 and vertically between the position of enabling the disc cartridge 1 to be loaded on the disc driving unit 26 and the position of loading the optical disc 5 on the disc table 39.

The distal ends of the supporting guide shafts 58, 59, 60 of the cartridge holder 51 are projected out of first and second sidewalls 35, 36 of the stationary substrate 21 via clearance holes 65, 66, 67 formed in the sidewalls 35, 36 in registration with the guide grooves 62, 63, 64 formed in the supporting base plate 25. These clearance guide holes 65, 66, 67 are wider in width than the guide grooves 62, 63, 64 so as not to obstruct movement of the supporting guide shafts 58 to 60 as well as to permit free movement of the supporting guide shafts 58 to 60 when the cartridge holder 51 descends towards the disc driving unit 26.

The cartridge transporting member 52 for transporting the cartridge holder 51 along the guide grooves 62 to 64 is provided between the first and second sidewalls 35 and 36 of the stationary substrate 21 so as to be moved on these sidewalls 35, 36 in the direction of horizontal movement of the cartridge holder 51, as shown in FIG. 6.

Figure 8:
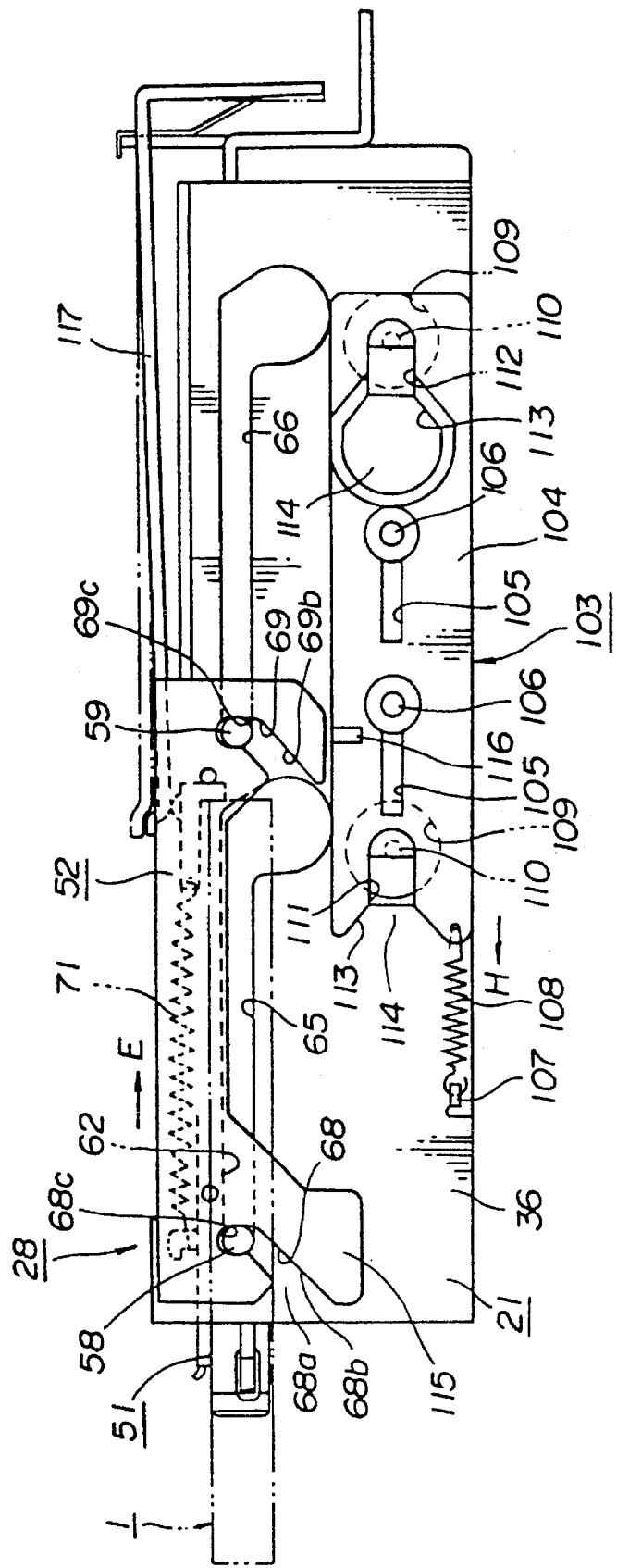
FIG. 8 is a left side view showing the disc cartridge loading apparatus according to the present invention, showing the state in which the cartridge holder has been moved to an initial position enabling the insertion or ejection of the disc cartridge.

The cartridge holder transporting member 52 is made up of first and second side plates 71, 72 and a connecting plate 73 interconnecting these side plates. The side plates 71, 72 depend at the outer sides of the sidewalls 35, 36 and are formed with cam grooves 68, 69, 70 which are opened at one end and which are engaged with the supporting guide shafts 58 to 60 of the cartridge holder 51 protruded from these sidewalls 35, 36, as shown in FIGS. 7 and 8. The connecting plate 73 is made up of a first side plate portion 73a and a second side plate portion 73b, which are interconnected by a set screw 73c, as shown in FIG. 6.

The cartridge holder transporting member 52 is supported by the first and second sidewalls 35, 36 by having plural U-shaped slide guide members 75 fitted to slide guide supports 35a, 36a of the stationary substrate 21. These slide guide members are mounted on the inner lateral side near the connecting part of the first and second side plates 71, 72 to the connecting plate 73. Besides, the transporting member 52 may be moved horizontally in stable state on the first and second sidewalls 35, 36 by being guided by the slide guide supporting pieces 76, 77.

The cartridge holder transporting member 52 is connected to the stationary substrate 21 by a pair of pivotal arms 79, 80 having its central part supported by a pivot 78, as shown in FIG. 6. The pivotal arm 79 is mounted by having its one end rotatably mounted on a supporting shaft 81 set on the connecting plate 73 of the cartridge holder transporting member 52 and by having a guide pin 82 set on its other end engaged in an elongated opening 84 formed in a piece of extension 83 extended from the upper side of the first sidewall 5 in a direction at right angles to the direction of travel of the transporting member 52. The pivotal arm 80 is mounted by having its one end pivotally mounted on a supporting shaft 86 set on a bent piece 85 provided at the upper edge of the second sidewall 36 of the stationary substrate 21 and by having a guide pin 87 on its other end engaged in an elongated opening 88 formed in the connecting plate 73 for extending in a direction at right angles to the direction of movement of the cartridge holder transporting member 52. The pivotal arms 79, 80, interconnecting the cartridge holder transporting member 52 and the stationary substrate 21 in the above-described manner, are opened or closed with a pivot shaft 78 as the center of rotation, by having the guide pins 82, 87 engaged in the elongated holes 84, 88 as the cartridge holder transporting member 52 is moved to realize stable movement of the cartridge holder transporting member 52.

Meanwhile, when the cartridge holder 51 is in the raised position with respect to the disc driving unit 26, and the supporting guide shafts 58 to 60 are positioned in the horizontal guide groove portion 62a, 63a, 64a of the cartridge holder guide grooves 62, 63, 64, the cartridge holder 51 being then in the state of horizontal movement, the cam grooves 68, 69, 70 provided in the cartridge holder transporting member 52 are kept engaged by the guide shafts 58 to 60 to permit horizontal movement of the cartridge holder 51 to guide the guide shafts 58 to 60 so as to be gradually raised or lowered in the course of movement of the transporting member 52 between the position in which the cartridge holder 51 is lowered towards the disc driving unit 26 and the position in which the holder is raised with respect to the disc driving unit 26. Besides, in the loading end state in which the optical disc 5 is loaded on the disc table 39 to permit rotation of the optical disc 5, the guide shafts 58 to 60 are disengaged by the movement of the cartridge holder transporting member 52. The cam grooves 68 to 70 are opened at ends 68a, 69a, 70a and have inclined surface sections 68b, 69b, 70b raised gradually from the open ends to be terminated at inner ends by perpendicular portions 68c, 69c, 70c, as shown in FIGS. 7 and 8.

Figure 10:
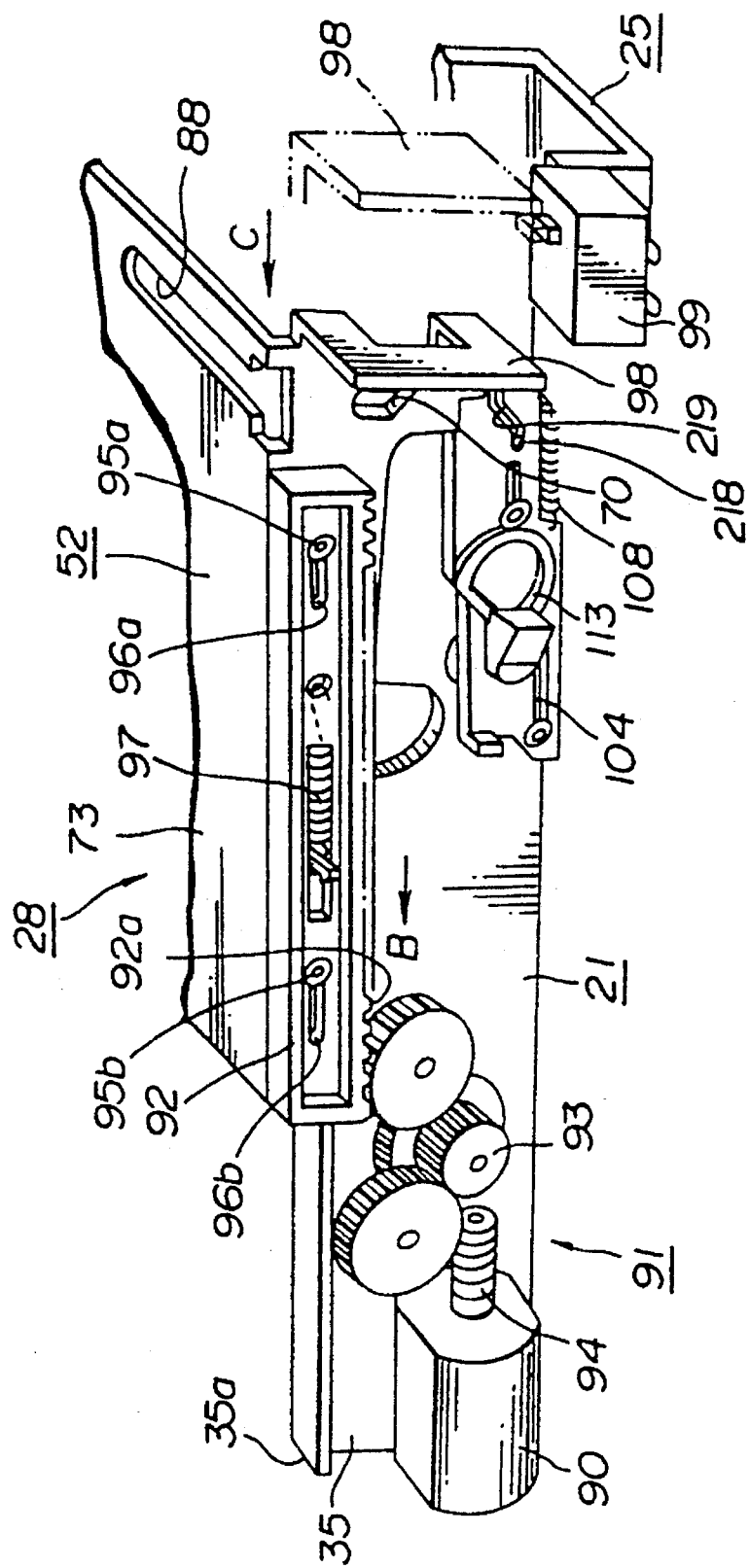
FIG. 10 is a perspective view showing a transporting member feed unit constituting the disc cartridge loading unit according to the present invention.

The cartridge holder transporting member 52 is moved by a feed unit 91 which is driven by a feed motor 90 provided on an outer lateral side of the first sidewall 35 of the stationary substrate 21, as shown in FIGS. 7 and 10. The feed unit 91 is made up of a rack plate 92 mounted on an upper edge of the second side plate 72, a connecting gearing 93 having plural gears meshing with a rack gear 92a of the rack plate 92 and a worm gear 94 provided on an output shaft of the feed motor 90 for meshing with the gearing 93.

The feed unit 91, inclusive of the worm gear 94, permits correct regulation of the movement position of the cartridge holder transporting member 52 unless the driving power is transmitted from the feed motor 90.

The rack plate 92 of the feed unit 91 has its through-holes 96a, 96b passed through by supporting shafts 95a, 95b set on the first side plate 72 of the cartridge holder transporting member 52 and is slidably supported on the first sidewall 35 within the range of the elongated through-holes 96a, 96b. Besides, the rack plate 92 is biased in the direction of arrow B in FIGS. 7 and 10 in a direction of meshing with the connection gearing 93 by a limiting spring 97 retained by the second sidewall 72. With the rack plate 92 thus connected to the worm gear 94 for sliding within the extent of the elongated through-holes 96a, 96b, the cartridge holder transporting member 52 may be moved within the range of the elongated holes 96a, 96b, as shown by an arrow C in FIG. 10, under the thrusting force produced when introducing the disc cartridge 1 into the cartridge holder 51, When the disc cartridge 1 is inserted into the cartridge holder 51, and the cartridge holder transporting member 52 is moved, a switch actuating piece 98 formed on the front side of the first sidewall 35 thrusts a control switch 99 of the feed motor 90 fitted to the stationary substrate 21 to initiate the driving of the feed motor 90 and the movement of the transporting member 52.

When the cartridge loading unit 28 composed of the above-described cartridge holder 51 and the cartridge holder transporting member 52 is at the initial position shown in FIGS. 6 to 8 of permitting the disc cartridge 1 to be inserted into or ejected from the cartridge holder 51, the cartridge holder 51 causes the supporting guide shafts 58 to 60 to be positioned at the front ends of the horizontal guide portions 62a, 63a, 64a of the cartridge holder guide grooves 62, 63, 64, so that these guide shafts 58 to 60 are engaged in perpendicular portions 68c to 70c of the cam grooves 68 to 70 provided in the transporting member 52.

If the disc cartridge 1 is introduced into the cartridge holder 51 and the transporting member 52 is moved against the biasing force of the limiting spring 97 biasing the rack plate 92, the control switch 99 being thrust by the switch thrusting piece 98 to initiate the forward and reverse rotation of the feed motor 90, the transporting member 52 is moved towards the disc driving unit 26 within the player main body 200 as indicated by arrow D in FIG. 7 and arrow E in FIG. 8. Since the cartridge holder 51 has the supporting guide shafts 58 to 60 engaged in the vertical portions 68c to 70c of the cam grooves 68 to 70, the cartridge holder 51 is moved along with the cartridge holder transporting member 52 in the direction shown by arrow D in FIG. 7 and arrow E in FIG. 8.

Figure 11:
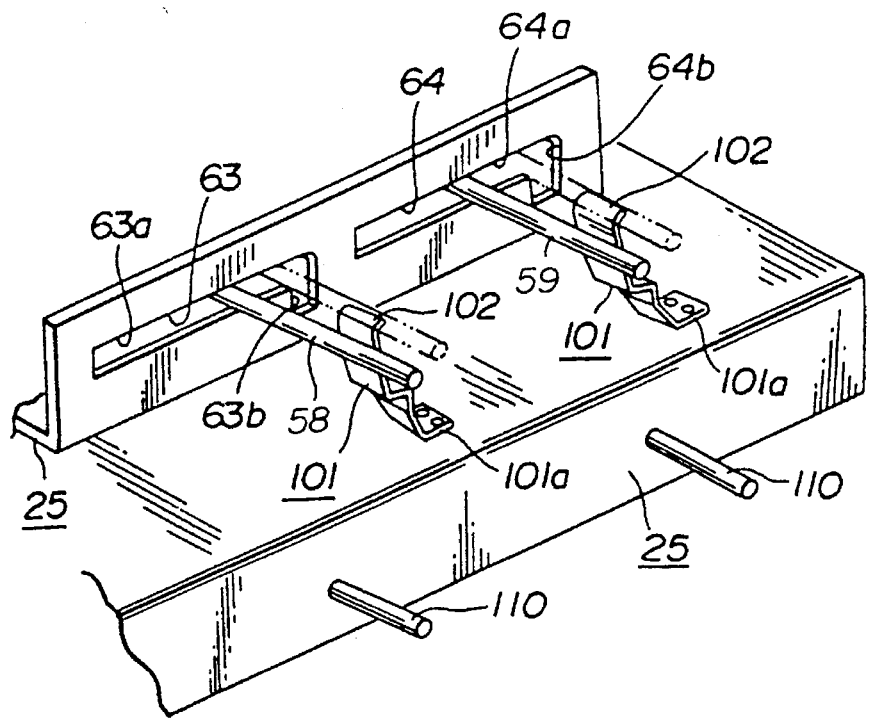
FIG. 11 is a perspective view showing a unit for unifying the drive supporting base plate to the stationary substrate during unification.
Figure 12:
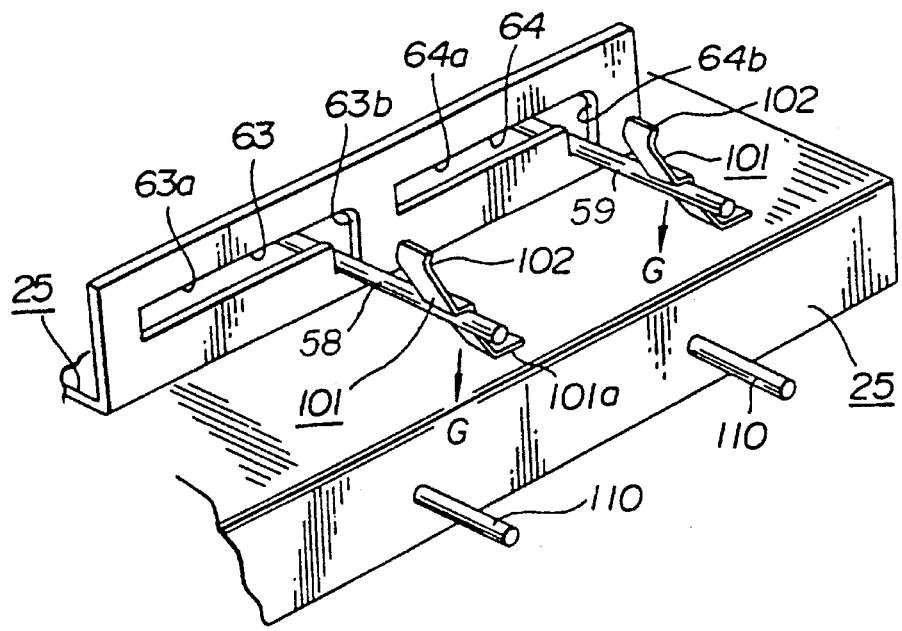
FIG. 12 is a perspective view showing the state in which the drive supporting base plate is unified to the stationary substrate.
Figure 13:
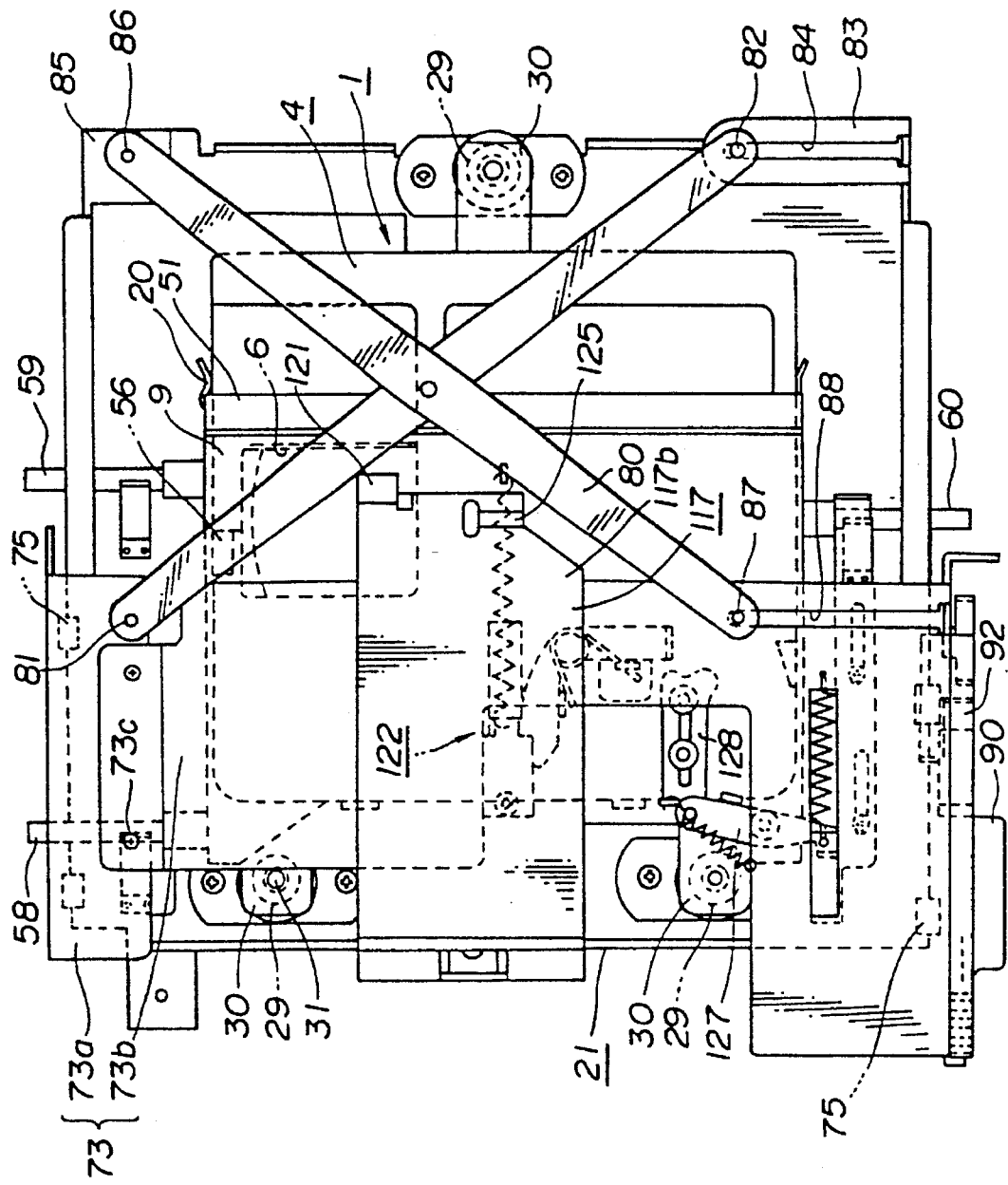
FIG. 13 is a plan view showing the state in which the disc cartridge has been loaded on the disc driving unit.

When the cartridge holder 51 is fed by the transporting member 52 as far as a position facing the vertical guides 62b, 63b, 64b of the guide grooves 62 to 64, as shown by chain-dotted line in FIG. 11, the supporting guide shafts 58 to 60 descend to the disc driving unit 26, by being guided by the vertical portions 62b, 63b, 64b, as shown in FIG. 12. When the cartridge holder 51 descends towards the disc driving unit 26, the transporting member 52 keeps on being moved as shown by arrow F in FIG. 14, so that the cartridge holder 51 continues to descend with the supporting guide shafts 58 to 60 being guided by the vertical portions 62b, 63b, 64b, with the guide shafts 58 to 60 being moved along the inclined surfaces 68b to 70b of the cam grooves 68 to 70. When the transporting member 52 is moved until the cartridge holder 51 descends to the disc driving unit 26, the supporting guide shafts 58 to 60 are disengaged from the cam grooves 68 to 70 via opening ends 68a to 70a. The result is that the cartridge holder 51 is separated from the transporting member 52 and the disc cartridge 1 is loaded on the disc driving unit 26, so that the optical disc 5 housed within the disc cartridge 1 is loaded on the disc table 29, as shown in FIG. 9.

Meanwhile, the cartridge holder 51 separated from the transporting member 52 may be freely moved so that the disc cartridge 1 cannot-be supported in position on the disc driving unit 26, while the optical disc 5 housed within the disc cartridge 1 cannot be correctly loaded on the disc table 39.

To this end, means are provided for unifying the cartridge holder 51 with the supporting base plate 25 when the cartridge holder 51 is lowered to the disc driving unit 26 so as to be detached from the transporting member 52.

This unifying means is provided by means which, when the cartridge holder 51 is fed by the cartridge holder transporting member 52 so that the supporting guide shafts 58 to 60 are brought to the position facing the vertical portions 62b, 63b, 64b of the supporting guide grooves 62 to 64 as shown in FIG. 11, are caused to bear on the guide shafts 58 to 60 to thrust these shafts in the descending direction along the vertical guides 62b, 63b, 64b so that the guide shafts 58 to 60 are caused to bear on the supporting base plate 25 when the cartridge holder 51 descends to the disc driving unit 26.

More concretely, the unifying means is a plate spring provided on the supporting base plate 25. The plate spring is attached to the supporting base plate 25 by having its proximal end 101a secured to the base plate 25 and by having a guide shaft thrusting portion 102 at the free end facing the supporting guide shafts 58 to 60 which are moved by being guided along the supporting guide grooves 62 to 64, as shown in FIG. 11. The plate spring is mounted at such a position that, when the supporting guide shafts 58 to 60 reach the position faced by the vertical guide groove portion 62b, 63b, 64b of the guide grooves 62 to 64, the thrusting portion 102 is caused to bear on the supporting guide shafts 58 to 60.

The plate spring 101 is adapted for applying a pressing force in the direction shown by arrow G in FIG. 12 of pressing the supporting guide shafts 58 to 60 when the cartridge holder 51 is lowered towards the disc driving unit 26.

When the cartridge holder 51 is moved by the cartridge holder transporting member 52 to a position in which the guide shafts 58 to 60 face the vertical guide portions 62b, 63b, 64b of the guide grooves 62 to 64, the plate spring 101 is caused to bear on the guide shafts 58 to 60, as shown in FIG. 11. When the transporting member 52 is moved further in the direction of arrow F in FIG. 14 from the state in which the plate spring 101 abuts on the guide shafts 58 to 60, the plate spring biases the cartridge holder 51 in a descending direction with the guide shafts 58 to 60 being guided by the vertical guide portions 62b, 63b, 64b. Consequently, the supporting guide shafts 58 to 60 are caused to descend along the inclined surfaces 68b, 69b, 70b of the cam grooves 68, 69, 70 by being guided by the vertical guide groove portions 62b, 63b, 64b.

The plate spring 101 thrusts the guide shafts 58 to 60 even after the cartridge holder 51 is lowered towards the disc driving unit 26 for maintaining the cartridge holder 51 pressed against the supporting base plate 25.

Figure 14:
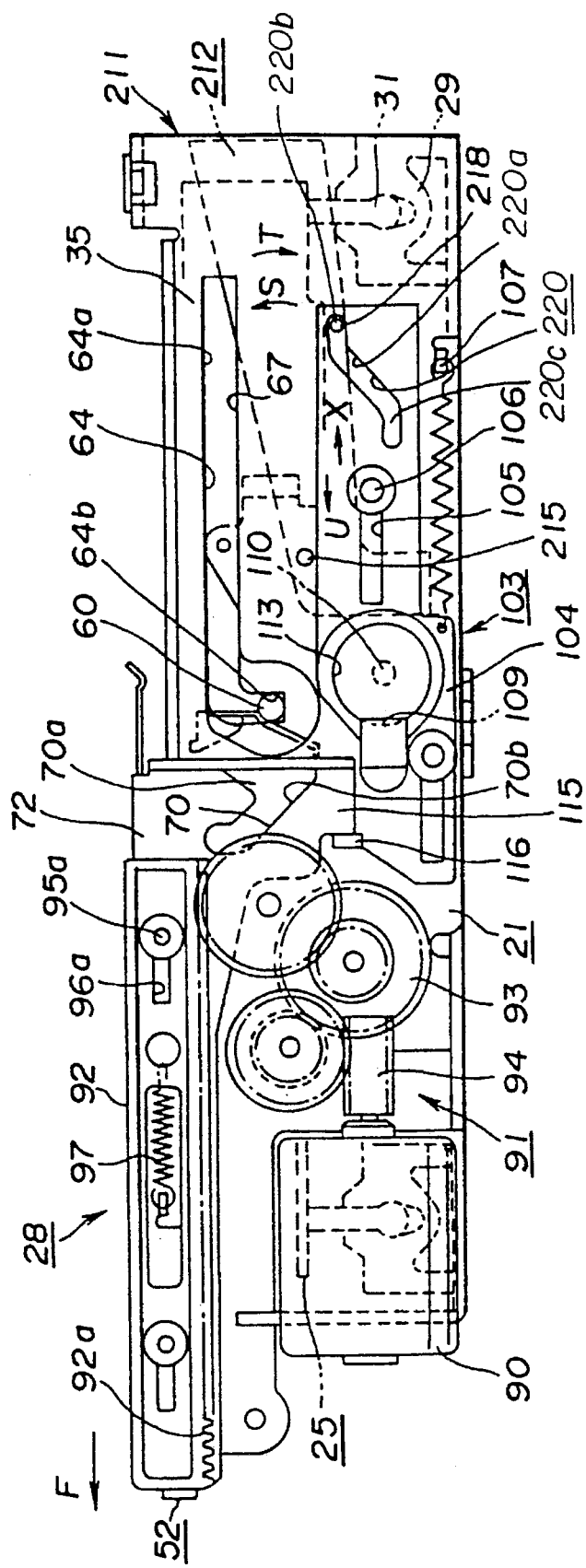
FIG. 14 is a right side view showing the state in which the disc cartridge has been loaded on the disc driving unit.
Figure 15:
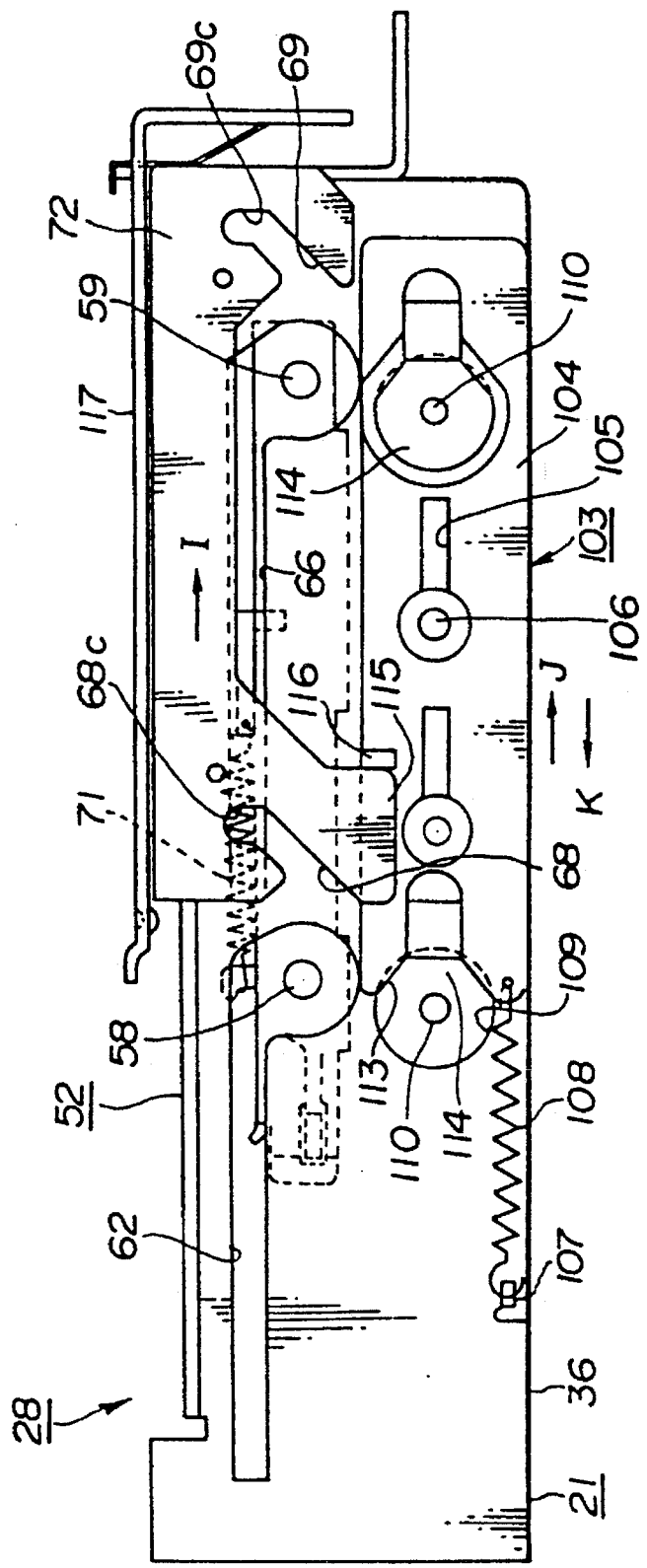
FIG. 15 is a left side view showing the state in which the disc cartridge has been loaded on the disc driving unit.

In the disc cartridge loading apparatus of the present invention, when the disc cartridge 1 is positioned on the disc driving unit 26 and the optical disc 5 is loaded on the disc table 39, the cartridge holder 51 is maintained in such a state in which the supporting guide shafts 58 to 60 are detached from the cam grooves 68 to 70 so that it is separated from the cartridge holder transporting member 52, as shown in FIGS. 14 and 15.

Consequently, for ejecting the disc cartridge 1 loaded on the disc driving unit 26, the guide shafts 58 to 60 need to be engaged with the cam grooves 68 to 70 for enabling the cartridge holder 51 to be moved by the transporting member 52.

Besides, in the disc player of the present embodiment, the supporting base plate 25 is supported on the stationary substrate 21 in a floating condition in which it may be flexed easily both vertically and horizontally, so that it becomes extremely difficult to have the guide shafts 58 to 60, once detached from the cam grooves 68 to 70, again engaged with the cam grooves 68 to 70.

For this reason, cartridge holder position adjustment units 103 are provided for guiding the guide shafts 58 to 60 so as to be easily engaged with the cam grooves 68 to 70 when the disc cartridge 1 is ejected from the disc driving unit 26. The cartridge holder position adjustment unit 103 also has a function of securing the supporting base plate 25, supported in a floating condition by the stationary substrate 21, to the stationary substrate 21 when the disc cartridge 1 is not loaded as yet in the disc player.

These units 103 are provided on the first and second sidewalls 35, 36 of the stationary substrate 21. However, only the adjustment unit provided on the second sidewall 36 is explained, and description of the unit provided on the first sidewall 35, for which the parts or components similar to those of the adjustment unit for the second sidewall 36 are indicated by corresponding numerals, is omitted for simplicity.

The cartridge holder position adjustment unit 103 includes a securing lever 104 for securing the supporting base plate 25 moved by the cartridge holder transporting member 52 after the cartridge holder 51 is lowered by the transporting member 52 towards the disc driving unit 26.

The securing lever 104 is supported by the second sidewall 36 by having slide guide holes 105, 105, elongated in a longitudinal direction, engaged by slide guide shafts 106, 106 set on the second sidewall 36, so that the lever may be moved within the extent of the slide guide holes 105, 105, as shown in FIG. 8. The securing lever 104 is biased at all times in the forward direction shown by arrow H in FIG. 8, towards the cartridge insertion/ejection opening 201, by a tension spring 108 retained by a spring retainer 107 formed by partially segmenting the second sidewall 36.

The lever 104 has engaging grooves 111, 112 engaged by stationary shafts 110, 110 which are provided on the first and second sidewalls 61, 61a of the supporting base plate 25 and which are projected via through-holes 109 formed in the first and second sidewalls 35, 36 of the stationary substrate 21. One end of each of the grooves 111, 112 are formed as an inclined guide 113 gradually increased in diameter. The function of the inclined guides 113 is to guide the fixed shaft 110 so as to be easily engaged with the grooves 111, 112.

The enlarged guide section of the inclined guide 113 is widely opened at 114. That is, when the fixed shafts 110, 110 are in the opened part 114, the shafts may be moved freely for establishing the floating state of the supporting base plate 25.

On one lateral side of the fixed lever 104, a thrusting actuator 116, thrust by a lever thrusting piece 115 formed by elongating the portion of the first side plate 71 of the transporting member 52 provided with the cam groove 69, is provided at a position of thrusting the securing lever thrusting piece 115 when the cartridge holder 51 is lowered by the transporting member 52 towards the disc driving unit 26.

The thrusting actuator 116, formed on the lever 104, provided on the first sidewall 35 of the stationary substrate 21, is thrust by the securing lever thrusting piece 115 formed by elongating the portion of the second side plate 72 of the cartridge main body 51 provided with the cam groove 70.

Consequently, when the transporting member 52 is moved to a position of enabling insertion and detachment of the disc cartridge 1, with the disc cartridge 1 not being as yet loaded, the lever 104 is moved in the direction shown by arrow H in FIG. 8 under the bias of the tension spring 108. At this time, the lever 104 is maintained in a state in which fixed shafts 110, 110 of the supporting base plate 25 are engaged in the grooves 111, 112, with the supporting base plate 25 being fixedly supported on the stationary substrate 21.

As the cartridge holder 52 has lowered the cartridge holder 51 as far as the supporting base plate 25 of the disc driving unit 26, and is further moved in a direction shown by an arrow I in FIG. 15, the lever 104 has its actuator 116 thrust by the thrusting piece 115 and is thereby moved inward as shown by arrow J in FIG. 15. By the movement of the lever 104 as shown by arrow J in FIG. 15, the fixed shafts 110, 110 are disengaged from the grooves 111, 112 for facing the opened ends 114. The result is that the supporting base plate 25 is disengaged from the stationary base plate 21 for establishing the floating state.

When an ejection button provided on the player main body 200 is actuated for ejecting the cartridge 1 loaded on the disc driving unit 26 for driving the feed motor 90 in reverse for moving the transporting member 52 in a direction shown opposite to that shown by arrow I in FIG. 15, the lever 104 having its thrusting operator 116 abutted on the lever thrusting piece 115 is moved in a direction shown by arrow K in FIG. 15 under the bias of the tension spring 108 along with the transporting member 52. This causes the fixed shafts 110, 110 of the supporting base plate 25 to be engaged with the grooves 111, 112, with the inclined guide 113 as a guide surface, for securing the supporting base plate 25 to the stationary base plate 21.

When the supporting base plate 25 is secured in this manner to the stationary substrate 21, the supporting guide shafts 58 to 60 are disengaged from the cam grooves 68 to 70. The cartridge holder 51, unified by the plate spring 101 to the supporting base plate 25, is secured with the supporting base plate 25. The supporting guide shafts 58 to 60 are also secured. The result is that these supporting guide shafts 58 to 60 are adjusted in their positions relative to the opening ends 68a, 69a, 70a of the cam grooves 68, 69, 70 provided in the cartridge holder transporting member 52. The supporting guide shafts 58 to 60, secured to the stationary substrate 21, are engaged with the opening ends 68a, 69a, 70a of the cam grooves 68, 69, 70 to effect stable and safe engagement of the supporting guide shafts 58 to 60 with the cam grooves 68 to 70, respectively.

Figure 16:
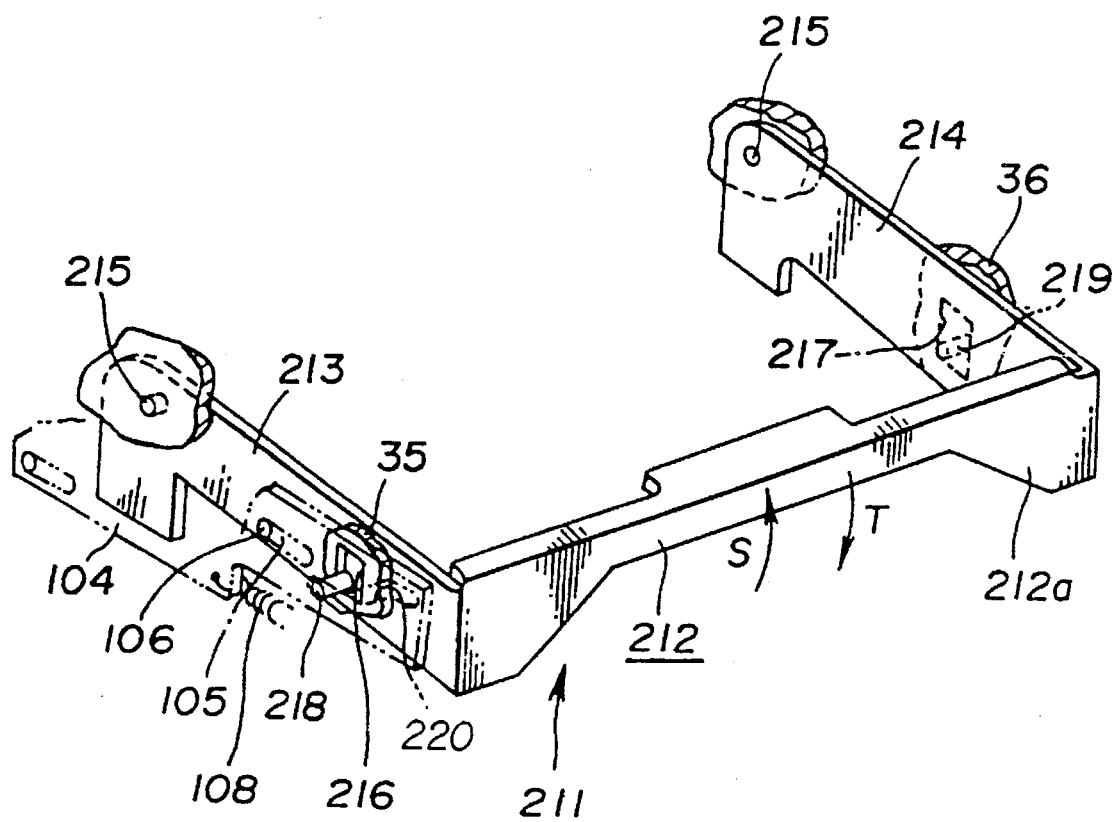
FIG. 16 is an exploded perspective view showing a cartridge insertion inhibiting mechanism.

The stationary substrate 21, supporting the supporting base plate 25 by means of the elastic supporting unit 29, is provided with a cartridge insertion/ejection opening opening/closing member 212 of cartridge insertion inhibiting unit 211 which, on actuation of the cartridge loading unit 28 for loading the disc cartridge 1 held by the cartridge holder 51 on the disc driving unit 26, closes the cartridge insertion/ ejection opening 201 of the player main body 200 for inhibiting the insertion of the disc cartridge 1 into the player main body 200. The opening/closing member 212 is a U-shaped member having a web 212a as an opening/closing plate for opening or closing the insertion/ejection opening 201, and both side arms as supporting arms 213, 214, as shown in FIGS. 5 and 16. The web 212a is an elongated flat plate of a width and length sufficient to close the opening 201.

The web 212a is supported for rotation in directions shown by arrows S and T in FIG. 16, by having the side arms 213, 214 extended on the inner lateral surfaces of the first and second lateral sidewalls 35, 36 of the stationary substrate 21 and by having the distal ends of the supporting arms 213, 214 pivotally mounted by supporting 215, 215 on the sidewalls 35, 36. Rotation guide pins 218, 219 inserted into openings 216, 217 formed in the sidewalls 35, 36 of the stationary substrate 21 are set on the outer lateral sides of the side arms 213, 214. These guide pins 218, 219 are inserted into openings 216, 217 for guiding the rotation of the opening/closing member 212 as well as controlling the range of rotation.

The distal end of the rotation guide pin 218 inserted into the opening 216 formed in the sidewall 35 of the stationary substrate 21 is inserted and engaged in an inclined cam groove 220 formed in the lever 104 mounted on the first sidewall 35, as shown in FIG. 7. The inclined cam groove 220 is formed for descending from the cartridge inserting/ ejecting opening 201 on the front side of the cartridge main body 200 towards the inside of the cartridge main body 200, and is composed of an inclined cam surface 220a on both sides of which horizontal sections 220b, 220c are formed.

The cartridge insertion/ejection opening opening/closing member 212, rotatably supported by the stationary substrate 21 with the rotation guide pin 218 engaged with the inclined cam , groove 220 of the securing lever 104, is rotated in a direction shown by arrows S and T in FIG. 16 to follow the movement of the lever 104. When the lever 104 is biased in a direction shown by arrow X in FIG. 7 under the bias of tension spring 108 and the cartridge transporting member 52 is moved to a position enabling insertion or ejection of the disc cartridge 1, the opening/closing member 212 is positioned at the horizontal section 220 below the inclined cam groove 220 and is rotated towards the bottom of the stationary substrate 21. That is, the web 212a of the opening/ closing member 212 is rotated to a position of closing the cartridge inserting/ejecting opening 201 of the player main body 200, When the cartridge inserting/ejecting opening 201 is opened, the disc cartridge 1 may be inserted into the player main body 200 via cartridge insertion/ejection opening 201 to enable the disc cartridge 1 to be inserted into and held by the cartridge holder 51 via the front opening 53.

For loading the disc cartridge 1 inserted into and held by the cartridge holder 51 on the disc driving unit 26, the transporting member 52 is moved downwards for lowering the cartridge holder 51 to the disc driving unit 26 and subsequently moved as shown by arrow F in FIG. 14 for moving the lever 104 via lever thrusting piece 115 as shown by arrow U in FIG. 14. The opening/closing member 212 is then rotated in the direction shown by arrow S in FIGS. 14 and 16. As the lever 104 is moved in the direction of arrow U in FIG. 14, the opening/closing member 212 is rotated as shown by arrow S in FIGS. 14 and 16 with shafts 215, 215 as the center of rotation, by the rotation guide pin 218 being moved along the inclined cam surface 220a of the inclined cam groove 220, the opening/closing plate 212a being moved to a position facing the insertion/ejection opening 201 of the player main body 200. By the rotation guide pin 218 being positioned in the horizontal section 220b of the inclined cam groove 220, the opening/closing member 212 is maintained in a state in which its opening/closing plate 212a closes the cartridge insertion/ejection opening 201 of the player main body 200.

When the cartridge holder 51 is lowered to the position of the disc driving unit 26 for loading the disc cartridge 1, the cartridge inserting/ejecting opening 201 of the player main body 200 is closed by the opening/closing member 212 for inhibiting insertion of the disc cartridge 1 into the cartridge holder 51. The result is that, when the disc cartridge 1 is in the loaded portion, dual loading of the disc cartridge is inhibited.

When the cartridge transporting member 52 is moved in a direction shown by arrow F in FIG. 14 by the reverse rotation of the feed motor 90 and the lever 104 is moved in a direction of arrow X in FIG. 14 under the bias of the tension spring 108 along with the cartridge transporting member 52, for ejecting the disc cartridge 1 loaded on the disc driving unit 26, the cartridge insertion/ejection opening opening/closing member 212 rotated to the position of closing the cartridge insertion/ejection opening 201 of the player main body 200 is rotated as shown by arrow T in FIGS. 14 and 16. That is, when the rotation guide pin 218 is moved along the inclined cam surface 220a of the inclined cam groove 220, by the movement of the lever 104 in the direction shown by arrow X in FIG. 14, the cartridge insertion/ejection opening opening/closing member 212 is rotated as shown by arrow T in FIGS. 14 and 16 about shafts 215, 215 as the center of rotation, so that the opening/closing plate 212a is moved on the bottom side of the stationary substrate 21 as shown in FIG. 7 to open the cartridge insertion/ejection opening 201 of the player main body 200 to permit insertion of the disc cartridge 1 into the player main body 200. That is, the disc cartridge 1 may be inserted into and held by the cartridge main body 51.

In the embodiment illustrated, the cartridge insertion/ ejection opening opening/closing member 212 opening or closing the cartridge insertion/ejection opening 201 is provided with the web 212a large enough to close the cartridge insertion/ejection opening 201. However, it is only sufficient if the opening/closing member 212 is so designed as to narrow the gap or width of the cartridge inserting/ejecting opening 201 for inhibiting the insertion of the disc cartridge 1 when the opening/closing member is moved to a position facing the cartridge insertion/ejection opening 201. Thus the opening/closing member may be in the form of a pin intruded into the cartridge insertion/ejection opening 201.

On the other hand, if the disc cartridge 1 is loaded while the disc cartridge remains mistakenly inserted into the cartridge holder 52, the disc cartridge 1 may be damaged, or the optical unit 23 and other units arranged in the disc driving unit 26 may also be damaged.

For this reason, the disc cartridge loading apparatus is provided with a unit for controlling the cartridge holder transporting member 52 transporting the cartridge holder 51 so as to be positioned at an initial position of enabling the insertion and ejection of the disc cartridge 1 relative to the cartridge holder 51 and for enabling the movement of the cartridge holder transporting member 52 and the feed of the cartridge holder 51 after detection of the normal insertion of the disc cartridge 1 into the cartridge holder 51.

When the cartridge holder transporting member 52 of the cartridge loading unit 28 has been moved to an initial position of enabling the insertion and ejection of the disc cartridge 1 relative to the cartridge holder 51 as shown in FIGS. 7 and 8, the transporting member 52 is controlled in its movement by a transporting member position controlling plate 117 provided on the stationary substrate 21.

Figure 18:
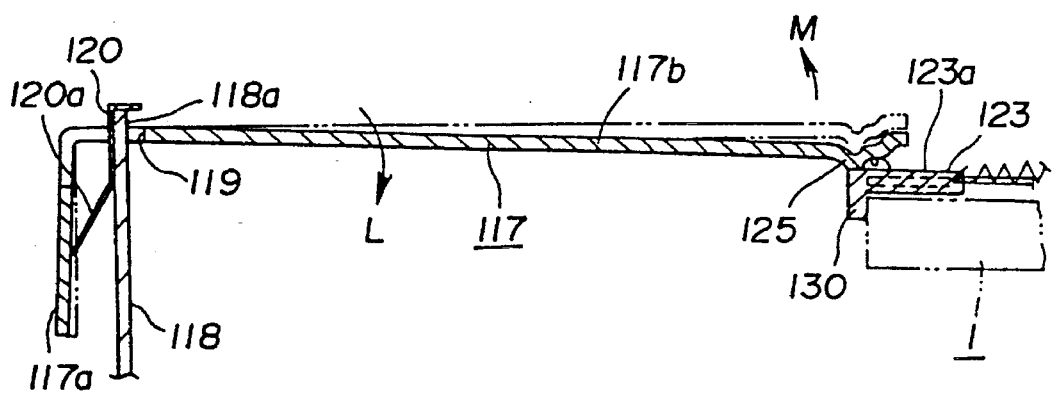
FIG. 18 is a partial cross-sectional view showing the mechanism for controlling movement of the cartridge holder transporting member.

The controlling plate 117 is an L-shaped plate member, as shown in FIG. 18. The plate member has an engaging hole 119 in the vicinity of a bent portion which is engaged by a supporting piece 118a provided on a rear wall 118 of the stationary substrate 21 so that the plate member is supported for rotation about the supporting piece 118a as a center of rotation. The plate member is biased in a direction shown by arrow L in FIG. 18 by a spring 120 provided between the rear wall 118 and a depending piece 117a provided on the rear wall 118 so that a controlling plate portion 117b extended on the transporting member 52 is rotated towards the transporting member 52.

The spring 120 has its proximal end secured to the rear wall 118 and has its free end 120a thrusting the depending piece 117a.

The distal end of the controlling plate portion 117b of the controlling plate 117 extended on the cartridge holder transporting member 52 has a engaging part 121 engaged with a rear side of the connecting plate 73 of the transporting member 52, as shown in FIG. 6. When the engaging part 121 is engaged with the connecting plate 73, as shown in FIGS. 6 and 17, the engaging part 121 is engaged with the connecting plate 73 for controlling the transporting member 52 to its initial position.

Figure 17:
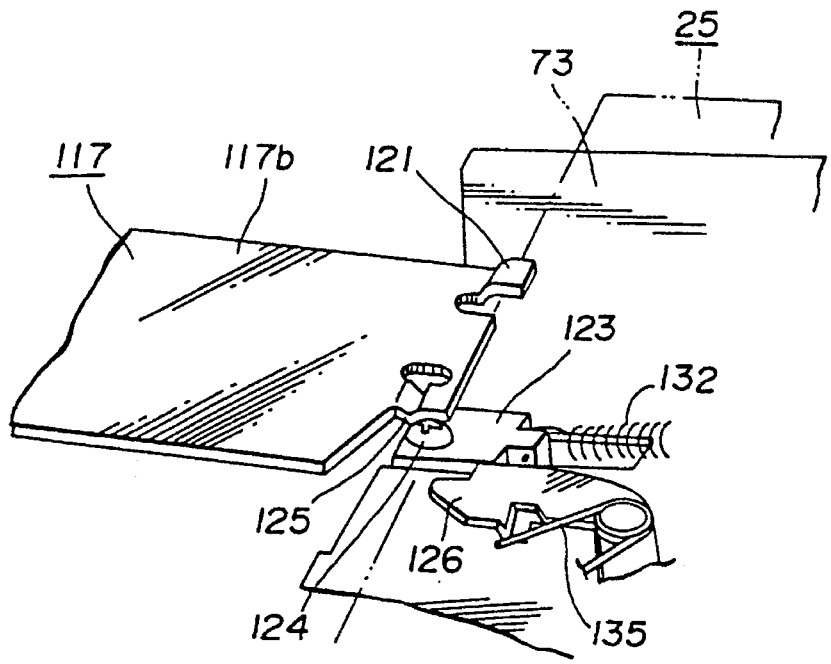
FIG. 17 is a partial perspective view showing a mechanism for controlling movement of the cartridge holder transporting member.

A thrust section 125 is protuberantly formed on the distal end of the controlling plate portion 117b, as shown in FIGS. 17 and 18. The thrust section is protruded towards the lower surface of the transporting member 52 so as to be thrust by a thrusting section 124 provided on the upper surface of a slider 123 of an ejection unit 122 actuated and moved by the disc cartridge 1 inserted into the cartridge holder 51. The thrust section 125 also functions as a detection unit for detecting the inserting position of the disc cartridge 1 inserted into the cartridge holder 51.

That is, the thrust section 125 functions as a detection member for detecting that the disc cartridge 1 has been correctly introduced into the cartridge holder 51 to a position which permits the slider 123 to be slid to permit the transport operation.

When the disc cartridge 1 is regularly inserted into the cartridge holder 51 and the slider 123 is moved by the disc cartridge 1, the thrust section 125 being then thrust by the thrusting section 124, the controlling plate 117 is rotated against the bias of the biasing spring 120 as shown by arrow M in FIG. 18 for disengaging the engaging part 121 from the connecting plate 73 of the cartridge transporting member 52 for enabling movement of the cartridge holder transporting member 52.

The ejection unit 122 having the thrusting section 124 controlling the rotation of the controlling plate 117 is arranged on the upper side of the cartridge holder 51.

Figure 19:
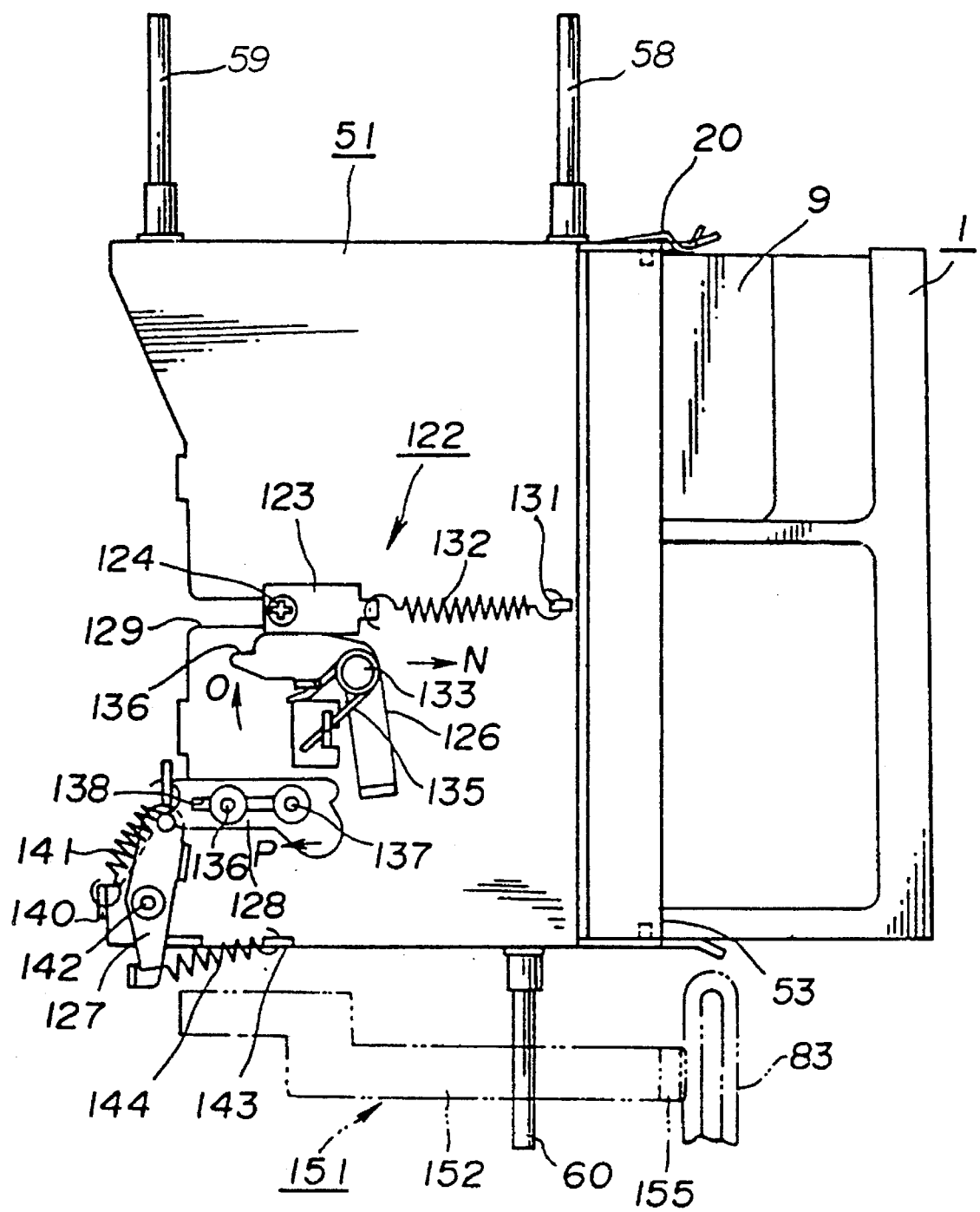
FIG. 19 is a plan view showing an ejection unit for ejecting disc cartridge.

The ejection unit 122 is made up of the slider 123 slidably mounted in the direction of insertion and ejection of the disc cartridge 1 with respect to the cartridge holder 51, a locking lever 126 for locking the slider 123, an unlocking lever 127 for unlocking the locking lever 126 with respect to the slider 123, and a slide lever 128 for relating the unlocking lever 127 with the locking lever 126, as shown in FIG. 19.

Figure 20:
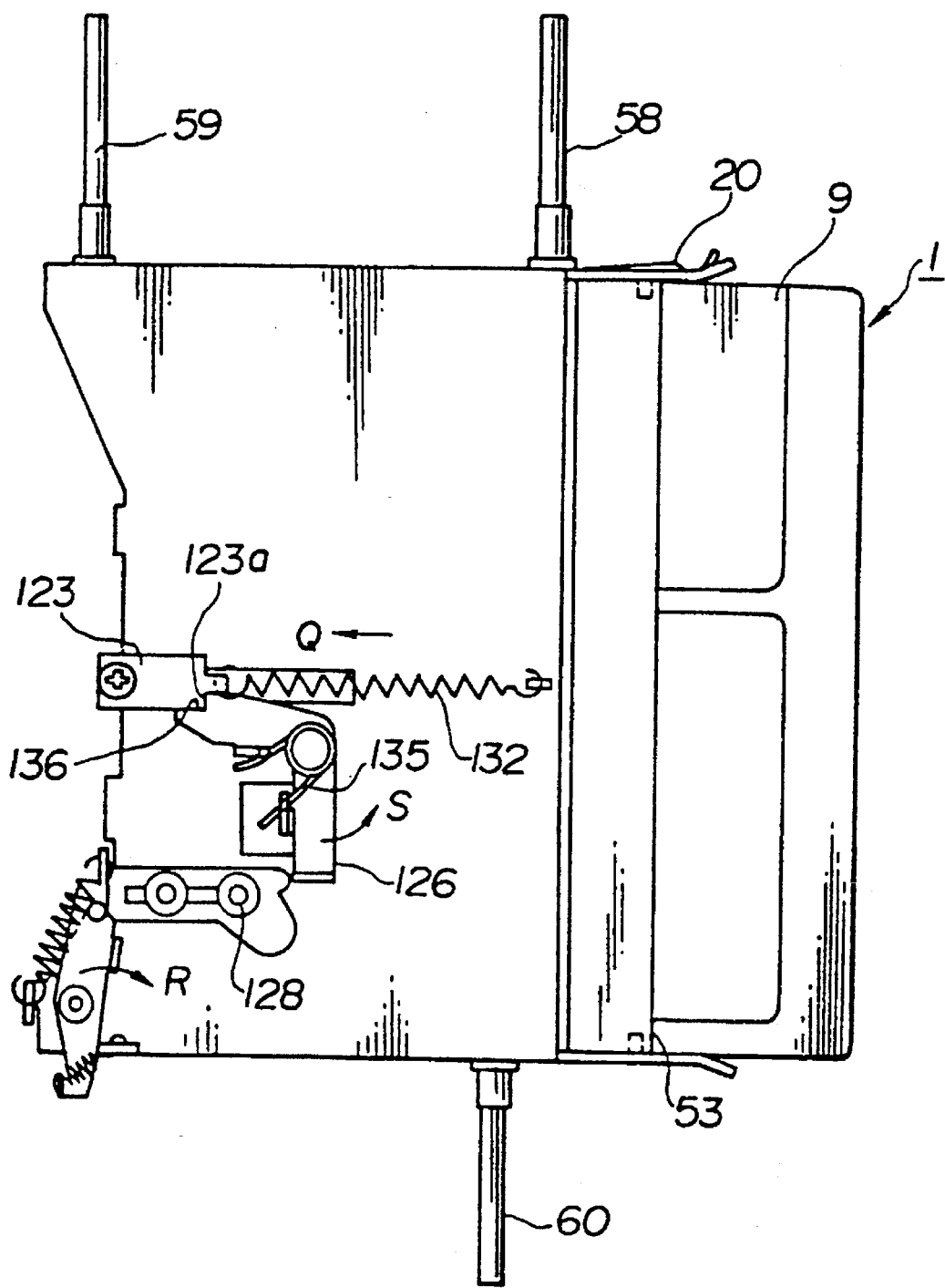
FIG. 20 is a plan view showing the state in which a disc cartridge has been loaded on a cartridge holder provided with the ejection unit.

The slider 123 is made up of a slider part 123a engaged in a slide guide groove 129 formed from a flat side to a mid portion of the cartridge holder 51 and an ejection part 130 formed on the proximal end of the side section 129, as shown in FIGS. 19 and 20. The ejection part 130 is thrust by the disc cartridge 1 projected inwardly of the cartridge holder 51 and thrusts the disc cartridge 1 at the time of ejection. The slider member 123 is slidably supported by the cartridge holder 51 by engaging the engaging groove formed on both sides of the slide guide groove 129 engaged with opposite sides of the slide guide groove 129 and is biased by a tension spring 132 in the direction of an arrow N in FIG. 19 of ejecting the disc cartridge 1 from the cartridge holder 51. The tension spring 132 is retained by a spring retainer 131 formed by partially segmenting the cartridge holder 51.

The sliding member 123 is adapted for causing the disc cartridge 1 to thrust the ejecting part 130, as shown in FIG. 19, when, with the disc cartridge 1 not controlled by the shutter member opening piece 56 and by the mistaken insertion inhibiting piece 57, the shutter member opening member 56 is intruded into the groove 12 to disengage the shutter member 9 from the shutter locking member 11 and the disc cartridge 1 is introduced into the cartridge holder 51 to a position of enabling the movement of the shutter member 9.

The locking lever 126 for locking the sliding member 123 is substantially L-shaped and is rotatably supported by a supporting shaft 133 set on the cartridge holder 61. The locking lever 126 is rotationally biased in a direction shown by arrow O in FIG. 19, so that its end having an engaging step 136 engaged with the sliding member 123 is rotated towards the slider 123 by a torsion coil spring 135 which is wrapped about the supporting shaft 133 and which has one end retained by a portion of the cartridge holder 51 and the other end retained by a portion of the locking lever 126. The locking lever 126 has its other end abuttably facing one end of the slide lever 128.

The slide lever 128 has an elongated opening 138 into which a pair of supporting shafts 136, 137 set on the cartridge holder 51 are engaged so that the slide lever may be slid within the extent of the elongated opening 138. The slide lever 128 is also biased by a tension spring 141 retained by a spring retainer 140 formed on the cartridge holder 51 in a direction away from the locking lever 126.

The unlocking lever 127 rotationally driving the locking lever 126 by means of the slide lever 128 is rotatably supported by a supporting shaft 142 set on the cartridge holder 51 and is rotationally biased in a direction away from the slide lever 128 by a tension spring 144 retained by a spring retainer 143 provided on the cartridge holder 51. The unlocking lever 127 has its one end abuttably faced by the other end of the slide lever 128.

In the above-described construction of the ejection unit 122, when the disc cartridge 1 is introduced without mistaken insertion into the cartridge holder 51, the ejection part 130 is thrust by the disc cartridge 1, the slider member 123 being moved as shown by arrow Q in FIG. 20 against the bias of the tension spring 132. When the slider member 123 is moved against the bias of the tension spring 132 and the retainer 123a at a corner of the slider member 123 reaches a position facing a retention step 136 of the locking lever 126, the locking lever 126 is rotated as shown by arrow R in FIG. 20, under the bias of the torsion coil spring 135, the locking lever 126 being locked at a position at which the slider member 123 has been moved against the bias of the tension spring 132. When the slider member 123 is locked in the state in which the tension spring 132 has been extended, a force of ejecting the disc cartridge 1 inserted into the cartridge holder 51 is afforded to the slider member 123.

Meanwhile, when the locking lever 126 is rotated for locking the slider member 123, the other end of the lever 126 is caused to bear on the one end of the slider lever 128.

Meanwhile, the ejection unit 122, which is in a state in which the tension spring 132 is extended for affording the force of ejection of the disc cartridge 1 to the slider member 123, is actuated by an ejection initiating unit 151 which is provided on the cartridge holder transporting member 52 and which is slid by movement of the transporting member 52. The ejection initiating unit 151 is comprised of an ejection unit actuating lever 152 mounted at a side of the cartridge holder transporting member 52.

The ejection unit actuating lever 152 is an elongated lever, as shown in FIG. 22, and has a thrusting actuating piece 154 at one end, which thrusting actuating piece thrusts a thrust piece 153 formed at one end of the unlocking lever 127 of the ejecting unit 122. The ejection actuating lever 152 also has a thrust actuating piece 155 at the other end, which thrust actuating piece 155 is abutted on and thrust by extension 83 formed on the first sidewall 35 of the stationary substrate 21.

The ejection unit actuating lever 152 has elongated openings 158, 159 which have longer axes along the longitudinal direction of the lever 152. Into these openings are engaged a pair of supporting shafts 156, 157 set on the inner side of the connecting plate 73 of the cartridge holder transporting member 52, so that the lever 152 is mounted on the cartridge holder transporting member 152 so as to be slid within the extent of these elongated openings 158, 159. The ejection unit actuating lever 152 is perpetually biased by a tension spring 161 retained by the cartridge holder transporting member 52 in a direction shown by arrow P in FIG. 22.

After the cartridge holder transporting member 52 has moved the cartridge holder 51 to an initial position of enabling insertion and ejection of the disc cartridge 1, the feed motor 90 is driven for moving the cartridge holder transporting member 52 towards the initial position for causing the sliding of the ejection unit actuating lever 152. That is, when the cartridge holder transporting member 52 has moved the cartridge holder 51 to the initial position of enabling the insertion and ejection of the disc cartridge 1, and the cartridge holder 51 is subsequently moved in a direction shown by arrow Q in FIGS. 7 and 22, a thrust actuating piece 155 provided on the lever 152 is caused to bear on the extension 83 formed on the first sidewall 35 of the stationary substrate 21 to stop the movement of the lever 152. When the cartridge holder transporting member 52 is further moved from this point towards the initial position as indicated by arrow Q in FIG. 7, the ejection unit actuating lever 152 is moved against the bias of the tension spring 161, as shown by arrow R in FIG. 22, that is, in an opposite direction to the direction of movement of the transporting member 52, and thrusts the thrust piece 153 formed on the unlocking lever 127 of the ejection unit 122 by the thrusting actuating piece 154.

The unlocking lever 127, which has a thrust piece 153 thrust by the lever 152, is rotated against the bias of tension spring 144 for sliding the slide lever 128. When the slide lever 128 is slid in this manner, the locking lever 126 is rotated by the slide lever 128 against the bias of the tension coil spring 135 as shown by arrow S in FIG. 20. When the locking lever 126 is rotated in this manner, the retention step 136 of the locking lever 126 is disengaged from the retainer 123a of the slider 123 for unlocking the slider 123. The slider 123, thus released from the locking lever 126, is promptly reset to its initial position under the bias of the tension spring 132 which is extended by the disc cartridge 1 and thereby given the force of elastic restoration. By the resetting of the slider 123, the disc cartridge 1, inserted into and held by the cartridge holder 51, has its rear side 4c thrust by the ejection part 130 of the slider 123, so that it is ejected from the cartridge holder 51.

The manner in which the above-described disc cartridge 1 is loaded by the above-described disc cartridge loading apparatus is hereinafter explained.

The disc cartridge 1 is moved to a position proximate to the cartridge insertion/ejection opening of the player main body so as to be inserted into the cartridge holder 51. That is, the cartridge holder transporting member 52 is moved to its initial position, as shown in FIGS. 6 to 8. At this time, the lever 104 causes the fixed shafts 110, 110 of the supporting base plate 25 to be engaged in grooves 111, 112, under the bias of the tension spring 108, without being thrust by the cartridge holder transporting member 52, for establishing a fixed supporting state.

At this time, the rotation guide pin 218 is positioned at a horizontal portion 220c of an inclined cam 220 provided in the securing lever 104, and the cartridge insertion/ejection opening opening/closing member 212 has been rotated to the side of the bottom of the stationary substrate 21 for opening the cartridge insertion/ejection opening 201 of the player main body 200, as shown in FIG. 7.

In this initial state, the cartridge holder 51 has the supporting guide shafts 58 to 60 engaged in vertical portions 68a, 69a, 70a of the cam grooves 68 to 70 of the transporting member 52 so that the cartridge holder may be moved in unison with the cartridge holder transporting member 52. The supporting guide shafts 58 to 60 are located in the horizontal guide portions 62a, 63a, 64a of the guide grooves 62 to 64 and hence in the raised position.

The disc cartridge 1 is introduced into the cartridge holder 51 via front opening 53. If the disc cartridge 1 is inserted in the regular state into the cartridge holder 51, the slider 123 is moved by the inserting lateral side 4b of the disc cartridge 1, as shown in FIG. 20, so that the force acting in the direction of ejecting the disc cartridge 1 from the cartridge holder 51 is stored in the ejection unit 122.

When the disc cartridge 1 is inserted in this manner into the cartridge holder 51, the insertion of the disc cartridge 1 is detected by the thrust section 125 of the controlling plate 117. When the thrust section 125 is thrust by the disc cartridge 1 as shown in FIG. 18, the position control of the cartridge holder transporting member 52 by the controlling plate 117 is released so that the transporting member 52 is free to be moved by the feed unit 91.

Besides, when the disc cartridge 1 is inserted into the cartridge holder 51, the cartridge holder 51 is thrust so that the cartridge holder transporting member 52 is moved as shown by arrow C in FIG. 10 against the bias of the limiting spring 97 biasing the rack plate 92. The switch actuating piece 98 actuates the controlling switch 99 for initiating the driving of the feed motor 90 in the forward direction so that the cartridge holder transporting member 52 is moved via feed unit 91 towards the disc driving unit 26 as shown by arrow B in FIG. 7. The cartridge holder 51 is moved by the movement of the transporting member 52 in the same direction as that of the transporting member 52, so that the cartridge holder 51 is lowered towards the disc driving unit 26, with the supporting guide shafts 58 to 60 being guided by guide grooves 62 to 64, for loading the disc cartridge 1 in position on the disc driving unit 26 for loading the optical disc 5 on the disc table 39. At this time, the supporting guide shafts 58 to 60 of the cartridge holder 51 are disengaged from the cam grooves 68 to 70 of the cartridge holder transporting member 52 so as to be supported by the plate spring 101 functioning as the unifying means, while the cartridge holder 51 is unified by pressure retention with the supporting base plate 25 under the bias of the plate spring 101.

The cartridge holder transporting member 52 is continuously moved inwardly as shown by arrow D in FIG. 7 by the feed motor 90, even after the cartridge holder 51 is lowered towards the disc driving unit 26, for moving the lever 104 against the bias of the tension spring 108 for disengaging the fixed shaft 110 of the supporting base plate 25 from grooves 111, 112 for establishing the floating state. In this floating state, the cartridge holder 51 is unified with the supporting base plate 25 by the plate spring 101, so that the supporting base plate 25 may be flexed easily. Consequently, external vibrations are isolated from the cartridge holder 51 inclusive of the disc cartridge 1 loaded on the disc driving unit 26 and the disc driving unit 26 is assured stable rotation by the disc rotating and driving unit 22 loaded on the disc table 39 and stable feed and control of the optical pickup 23 for realizing recording/reproduction of information signals with good recording/reproducing characteristics without dropout of the information signals.

When the cartridge holder transporting member 52 has been moved to a position in which the lever 104 reaches the position of setting the floating state of the supporting base plate 25, the feed motor 90 is brought to a standstill to complete the loading of the disc cartridge 1.

The sequence of operations for ejecting the disc cartridge 1 loaded on the disc driving unit 26 is hereinafter explained. When the ejection button, not shown, is activated, the disc driving unit 26, which is in the driving state, is brought to a standstill and the feed motor 90 starts to be driven in reverse for transferring the cartridge transporting member 52 as shown by arrow I in FIG. 15, that is towards the cartridge holder 51 in the lower position towards the disc driving unit 26, by means of the feed unit 91.

When the cartridge holder transporting member 52 is moved towards the cartridge holder 51, the securing lever 104 is moved in the resetting direction shown by arrow K in FIG. 15 for engaging the fixed shaft 110 of the base prate 25 in grooves 111, 112 for securing the base plate 25 to the substrate 21. The cartridge holder 51, unified by prate spring 101 to substrate 21, is also secured to substrate 21.

After securing the cartridge holder 51 and the base prate 25 to the stationary substrate 21, the transporting member 52 is moved in the direction shown by arrow I in FIG. 15 for causing the guide shafts 58 to 60 of the cartridge holder 51 into cam grooves 68, 69, 70 for unifying the cartridge holder 51 to the transporting member 52. The transporting member 52 is further moved in a direction shown by arrow I in FIG. 15 so that the cartridge holder 51, guided by guide grooves 62 to 64, is raised from the disc driving unit 26 and moved towards an initial position of enabling the insertion and ejection of the disc cartridge 1.

The cartridge holder transporting member 52, moved in a direction of allowing the insertion or ejection of the disc cartridge 1, causes the thrust actuating piece 155 of the ejecting unit actuating lever 152 to bear on the extension 83 on the substrate 21 to shift the actuating lever 152 against the bias of tension spring 161 to rotate the unlocking lever 127 of the ejecting unit 122 by the thrusting actuating piece 154 for unlocking the slider 123 for ejecting the disc cartridge in the cartridge holder 52 as shown in FIG. 22.

When moved to a position of moving the actuating lever 152, the cartridge holder transporting member 52 terminates the operation of the feed motor 90 by thrusting the controlling switch 99 for completing the ejection of disc cartridge 1, as shown in FIG. 22.

When the transporting member 52 is moved to the position of moving the actuating lever 152, the securing lever 104 is reset to its initial position under the bias of the tension spring 108. By the resetting of lever 104 to its initial position, the cartridge insertion/ejection opening opening/closing member 212 is rotated towards the bottom of stationary substrate 21 for opening the cartridge insertion/ejection opening 201 for enabling the disc cartridge 1 to be inserted into and held by cartridge holder 51.

What is claimed is:

1. A disc cartridge loading apparatus for a recording/reproducing apparatus for loading a disc cartridge housing a disc having an information signal recorded thereon on a cartridge loading unit in the recording/reproducing apparatus, comprising a drive unit supporting base plate having loaded thereon a driving unit for driving said disc, said driving unit supporting base plate being flexibly supported on a stationary substrate by elastic supporting means and having a plurality of shafts projecting from sidewalls thereof, a cartridge holder for supporting said disc cartridge inserted into a main body of said recording/reproducing apparatus, plural supporting members projecting from opposite sides of said cartridge holder, each of said plural supporting members engaging L-shaped guide slots formed in opposite sidewalls of said drive unit supporting base plate for movably supporting said cartridge holder, wherein said guide slots are closed at opposite ends thereof for restricting movement of said plural supporting members for guiding said cartridge holder in a horizontal and a vertical direction, a cartridge holder transporting member movably supported by said stationary substrate for movement in a direction of insertion into or ejection from said main body of said recording/reproducing apparatus, said cartridge holder transporting member having a plurality of cam grooves for engagement with said plural supporting members of said cartridge holder such that each of said plural supporting members that engages a cam groove simultaneously engages a corresponding guide slot, said cartridge holder transporting member being moved for loading said disc cartridge on said cartridge loading unit, each of said plurality of cam grooves being closed at a first end and having an opening at a second end thereof opposite said first end for release of said engagement between each corresponding one of said plural supporting members and said cam groove at a state of completion of loading of said disc cartridge, and cartridge holder position adjustment means for causing said plural supporting members to align with said opening ends of said plurality of cam grooves for engagement therewith during an operation of ejecting said disc cartridge out of said main body, said position adjusting means including a securing lever slidably supported by said stationary substrate, said securing lever having a plurality of engaging grooves for engaging said plurality of shafts of said drive unit supporting base plate.

2. The loading apparatus for a recording/reproducing apparatus as defined in claim 1 wherein said position adjustment means further comprises a thrusting actuator projecting from said securing lever for engagement with said cartridge holder transporting member for moving said securing lever in a first direction, at least one of said plurality of engaging grooves of said securing lever of said cartridge holder position adjustment means includes an inclined surface, and said securing lever is biased in a second direction opposite said first direction.

3. The loading apparatus for a recording/reproducing apparatus as defined in claim 2 wherein said supporting member is position-adjusted for being engaged with said opening end of said cam groove by said cartridge holder position adjustment means as a result of movement of said cartridge holder transporting member for ejecting said disc cartridge out of said main body.

4. The loading apparatus for a recording/reproducing apparatus as defined in claim 1 further comprising a disc rotating and driving unit loaded on said disc driving unit for rotationally driving a disc and means for unifying said disc driving unit and said cartridge holder when said cartridge holder has been moved to a position of loading said disc on said disc driving unit.

5. The loading apparatus for a recording/reproducing apparatus as defined in claim 1 wherein said cartridge holder transporting member comprises ejection initiating means for initiating an ejecting operation of an ejection unit attached to said transporting member adapted for ejecting said disc cartridge held by said cartridge holder in connection with a resetting operation of said cartridge holder transporting member whereby said cartridge holder is moved towards a position of insertion or ejection of said disc cartridge with respect to said cartridge holder.

6. The loading apparatus for a recording/reproducing apparatus as defined in claim 1 further comprising position controlling means for controlling a position of said cartridge holder transporting member, said position controlling means controlling said position of said cartridge holder transporting member such that a position of enabling insertion/ejection of said disc cartridge with respect to said main body can be attained and releasing position control of said cartridge holder transporting member by said disc cartridge transported by said transporting member.

7. The loading apparatus for a recording/reproducing apparatus as defined in claim 1 further comprising position-controlling means for controlling a position of said cartridge holder transporting member such that a position of enabling insertion/ejection of said disc cartridge with respect to said main body can be attained and means for detecting an inserting state of said disc cartridge relative to said transporting member for controlling said position-controlling means based on a result of detection.

8. The loading apparatus for a recording/reproducing apparatus as defined in claim 1 further comprising transporting member position controlling means for controlling a position of said cartridge holder transporting member such that a position at which said cartridge holder has been moved and a position of enabling insertion or ejection of said disc cartridge can be attained, and cartridge inserting position detection means for detecting an inserting state of said disc cartridge into said cartridge holder for controlling said position-controlling means based on a result of detection.

9. The loading apparatus for a recording/reproducing apparatus as defined in claim 1, wherein said disc cartridge comprises a first disc cartridge and further comprising cartridge insertion inhibiting means operated in connection with movement of said cartridge holder transporting member for inhibiting insertion of a second disc cartridge into a cartridge insertion/ejection opening formed in said main body during loading of said first disc cartridge.

10. A disc cartridge loading apparatus for a recording/reproducing apparatus for loading a disc cartridge housing a disc having an information signal recorded thereon on a cartridge loading unit in said recording/reproducing apparatus, comprising a supporting base plate;

a disc driving unit mounted on said supporting base plate and having loaded thereon a disc rotating and driving unit for rotationally driving said disc housed in said disc cartridge, a cartridge holder holding said disc cartridge, including a plurality of supporting members projecting from opposite sides of said cartridge holder and being movable relative to said disc driving unit, and means for unifying said disc driving unit and said cartridge holder when said cartridge holder is moved to a position of loading said disc on said disc driving unit, wherein said means for unifying comprises a plurality of plate springs fixedly mounted on said supporting base plate wherein said plate springs bias said cartridge holder toward said disc driving unit while said plate springs are engaged with respective ones of said plurality of supporting members of said cartridge holder in said position of loading, and said plate springs bias said cartridge holder away from said disc driving unit during disengagement of the plate springs and respective ones of said plurality of supporting members of said cartridge holder while said cartridge holder moves toward or away from a position of enabling said disc cartridge to be inserted into or ejected from said cartridge holder.

11. The loading apparatus for a recording/reproducing apparatus as defined in claim 10, wherein said disc cartridge comprises a first disc cartridge and further comprising cartridge insertion inhibiting means operated in connection with movement of said cartridge holder transporting member for inhibiting insertion of a second disc cartridge into a cartridge insertion/ejection opening formed in said main body during loading of said first disc cartridge.

* * * * *